US012661717B2

(12) United States Patent
Hikiji et al.

(10) Patent No.: US 12,661,717 B2
(45) Date of Patent: Jun. 23, 2026

(54) CUTTING TOOLS

(71) Applicant: Sumitomo Electric Hardmetal Corp., Itami (JP)

(72) Inventors: Masahito Hikiji, Itami (JP); Susumu Okuno, Itami (JP); Takato Yamanishi, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 406 days.

(21) Appl. No.: 18/284,866

(22) PCT Filed: Feb. 7, 2022

(86) PCT No.: PCT/JP2022/004701
§ 371 (c)(1),
(2) Date: Sep. 29, 2023

(87) PCT Pub. No.: WO2023/148973
PCT Pub. Date: Aug. 10, 2023

(65) Prior Publication Data
US 2024/0189921 A1 Jun. 13, 2024

(51) Int. Cl.
B23B 27/14 (2006.01)
(52) U.S. Cl.
CPC ........ B23B 27/148 (2013.01); B23B 2224/04 (2013.01); B23B 2224/32 (2013.01);
(Continued)
(58) Field of Classification Search
None
See application file for complete search history.

(56) References Cited

U.S. PATENT DOCUMENTS 6,251,508 B1 * 6/2001 Ruppi .................. C23C 30/005
428/323
2012/0269589 A1 * 10/2012 Igarashi ................ C23C 28/044
407/119
(Continued)

FOREIGN PATENT DOCUMENTS

EP 0736615 A2 * 10/1996 ............. C23C 16/30
EP 3851230 A1 7/2021
(Continued)

*Primary Examiner* — Seth Dumbris
(74) *Attorney, Agent, or Firm* — XSENSUS LLP

(57) ABSTRACT

A cutting tool comprising a base material and a coating; wherein: the coating comprises a titanium compound layer and an $\alpha\text{-Al}_2\text{O}_3$ layer; the $\alpha\text{-Al}_2\text{O}_3$ layer comprises a region A1 and a region A2; the titanium compound layer comprises a region B1 and a region B2; an average particle diameter $a1$ of the $\alpha\text{-Al}_2\text{O}_3$ particles in the region A1, an average particle diameter $a2$ of the $\alpha\text{-Al}_2\text{O}_3$ particles in the region A2, an average particle diameter $b1$ of the titanium compound particles in the region B1, and an average particle diameter $b2$ of the titanium compound particles in the region B2 satisfy relationships represented by respective expressions 1 to 3:

$$0.80 \le a2/b2 \le 1.27 \qquad \text{Expression 1}$$

$$1.50 \le a1/a2 \le 10 \qquad \text{Expression 2}$$

$$1.45 \le b1/b2 \le 5 \qquad \text{Expression 3}$$

; and
the average particle diameter $b1$ is 0.10 μm or more and 0.50 μm or less.

13 Claims, 4 Drawing Sheets

(52) U.S. Cl.
   CPC ..... *B23B 2228/105* (2013.01); *B23B 2228/36*
                    (2013.01); *B23B 2228/44* (2013.01)

(56) References Cited

U.S. PATENT DOCUMENTS

| | | | | |
|---|---|---|---|---|
| 2016/0175940 A1 * | 6/2016 | Lindahl | ................ | C23C 28/048 |
| | | | | 428/141 |
| 2016/0298232 A1 * | 10/2016 | Kang | ................... | C23C 28/048 |
| 2017/0191169 A1 | 7/2017 | Imamura et al. | | |
| 2020/0361002 A1 | 11/2020 | Ono et al. | | |

FOREIGN PATENT DOCUMENTS

| | | | |
|---|---|---|---|
| EP | 3868501 | A1 | 8/2021 |
| JP | 2012-096303 | A | 5/2012 |
| JP | 5872748 | B1 | 3/2016 |
| JP | 6210348 | B1 | 10/2017 |
| JP | 2019-025615 | A | 2/2019 |

* cited by examiner

Peak portion T1          Bottom portion B1

CUTTING TOOLS

CROSS-REFERENCE TO RELATED APPLICATION

The present application is based on PCT filing PCT/JP2022/004701, filed Feb. 7, 2022, the entire contents of which are incorporated herein by reference.

TECHNICAL FIELD

The present invention relates to cutting tools.

BACKGROUND ART

Cutting tools having a coating formed on a base material have been conventionally used. Aluminum oxide having an a-type crystal structure (hereinafter also referred to as "a-Al$_2$O$_3$") has been used as a coating material, due to its excellent mechanical properties (PTL).

CITATION LIST

Patent Literature

PTL 1: Japanese Patent Laying-Open No. 2012-96303

SUMMARY OF INVENTION

The cutting tool of the present disclosure is a cutting tool comprising a base material and a coating arranged on the base material; wherein:

the coating comprises a titanium compound layer arranged on the base material and an α-Al$_2$O$_3$ layer arranged directly on the titanium compound layer;

the α-Al$_2$O$_3$ layer is composed of a plurality of α-Al$_2$O$_3$ particles;

the α-Al$_2$O$_3$ layer comprises a region A1 and a region A2, the region A1 is a region sandwiched between an imaginary plane SA2, which is located at a distance of 0.5 μm from an interface P1 between the titanium compound layer and the α-Al$_2$O$_3$ layer toward the surface side of the coating, and an imaginary plane SA3, which is located at a distance of 1.0 μm from the interface P1 toward the surface side of the coating, the region A2 is a region sandwiched between the interface P1 and an imaginary plane SA1 that is located at a distance of 0.3 μm from the interface P1 toward the surface side of the coating;

the titanium compound layer is composed of a plurality of titanium compound particles;

the titanium compound particles are one selected from the group consisting of TiCN particles, TiCNO particles, TiAlCN particles and TiAlCNO particles:

the titanium compound layer comprises a region B1 and a region B2;

the region B1 is a region sandwiched between an imaginary plane SB2, which is located at a distance of 0.5 μm from the interface P1 toward the base material side, and an imaginary plane SB3, which is located at a distance of 1.0 μm from the interface P1 toward the base material side;

the region B2 is a region sandwiched between the interface P1 and an imaginary plane SB1 that is located at a distance of 0.3 μm from the interface P1 toward the base material side, an average particle diameter a1 of the α-Al$_2$O$_3$ particles in the region A1, an average particle diameter a2 of the α-Al$_2$O$_3$ particles in the region A2, an average particle diameter b1 of the titanium compound particles in the region B1, and an average particle diameter b2 of the titanium compound particles in the region 32 satisfy relationships represented by respective expressions 1 to 3.

$$0.80 \leq a2/b2 \leq 1.27 \qquad \text{Expression 1}$$
$$1.50 \leq a1/a2 \leq 10 \qquad \text{Expression 2}$$
$$1.45 \leq b1/b2 \leq 5; \text{ and} \qquad \text{Expression 3}$$

the average particle diameter b1 is 0.10 m or more and 0.30 μm or less.

DETAILED DESCRIPTION

Figure 1:
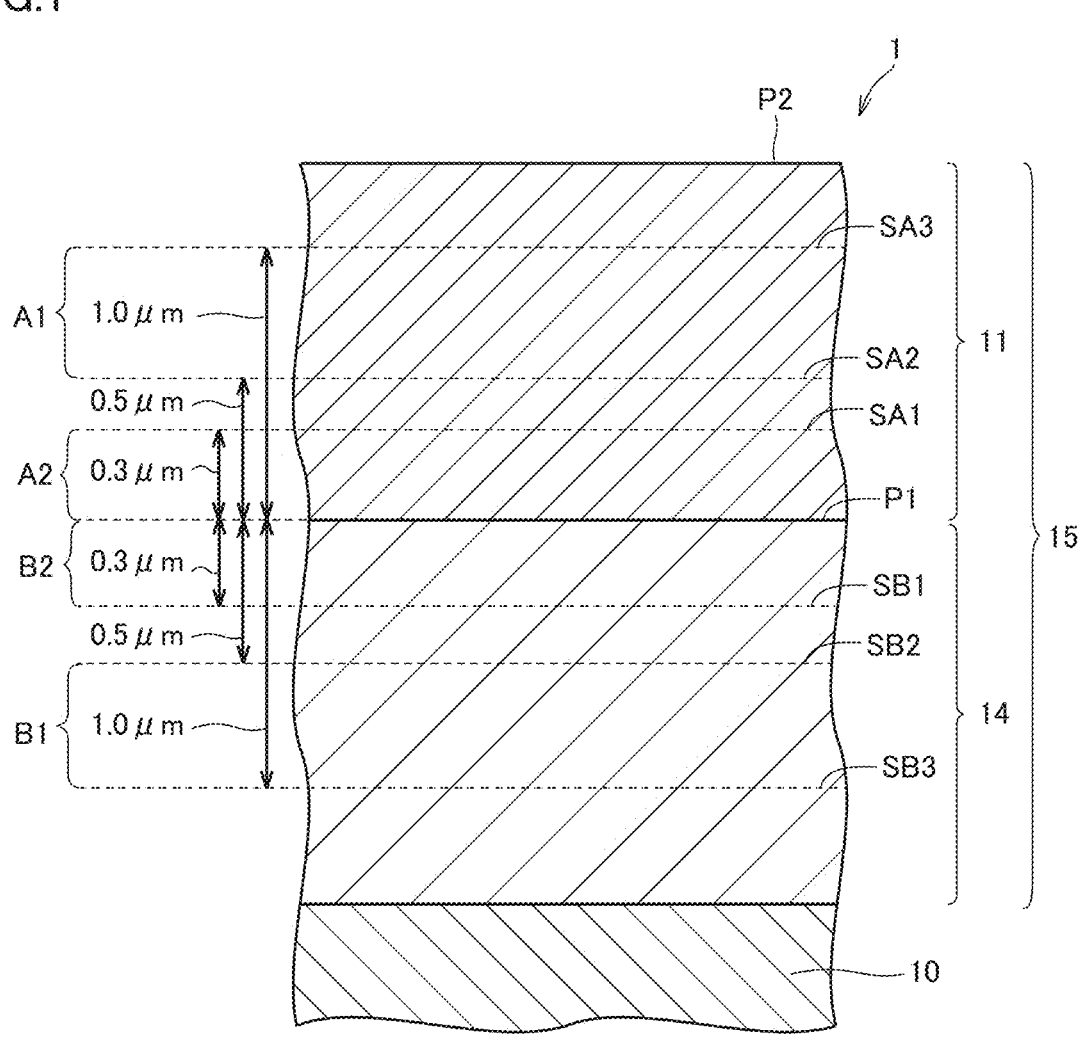
FIG. 1 is a schematic diagram showing an example of a cross section of a cutting tool according to Embodiment 1

Problem to be Solved by the Present Disclosure

An α-Al$_2$O$_3$ layer is excellent in mechanical properties, but requires further improvement in adhesion to the other layers and in breakage resistance. In the case of the cutting tool in PTL 1, the ratio b1/a1 between the number of crystal grains, a1 on the side of the titanium compound layer and the number of crystal grains on the side of the α-Al$_2$O$_3$ layer, b1 has been adjusted to 0.8<b1/a1<1.2 at the interface between the lower layer (titanium compound layer) and the upper layer (α-Al$_2$O$_3$ layer), in order to improve chipping resistance and peeling resistance of the cutting tool. In the case of the cutting tool of PTL 1, the titanium compound layer has been pretreated followed by formation of the α-Al$_2$O$_3$ layer, for the adjustment. As a result, since a layer different in a composition from that of the bulk portion of the titanium compound layer is formed in the vicinity of the interface of the titanium compound layer, adhesion is reduced between the layers different in a composition, peeling tends to occur and sufficient tool life cannot be obtained. Accordingly, cutting tools comprising an α-Al$_2$O$_3$ layer as a coating are required to have a further improvement in tool life.

Therefore, an object of the present disclosure is to provide a cutting tool, comprising an α-Al$_2$O$_3$ layer as a coating, which has a long tool life.

Advantageous Effect of the Present Disclosure The cutting tool of the present disclosure is a cutting tool comprising an α-Al$_2$O$_3$ layer as a coating and can have a long tool life.

DESCRIPTION OF EMBODIMENTS

First, Embodiments of the present disclosure will be listed and illustrated.

(1) The present disclosure is a cutting tool comprising a base material and a coating arranged on the base material; wherein:

the coating comprises a titanium compound layer arranged on the base material and an $\alpha$-$Al_2O_3$ layer arranged directly on the titanium compound layer.

the $\alpha$-$Al_2O_3$ layer is composed of a plurality of $\alpha$-$Al_2O_3$ particles;

the $\alpha$-$Al_2O_3$ layer comprises a region A1 and a region A2;

the region A1 is a region sandwiched between an imaginary plane SA2, which is located at a distance of 0.5 µm from an interface P1 between the titanium compound layer and the $\alpha$-$Al_2O_3$ layer toward the surface side of the coating, and an imaginary plane SA3, which is located at a distance of 1.0 µm from the interface P1 toward the surface side of the coating, the region A2 is a region sandwiched between the interface P1 and an imaginary plane SA1 that is located at a distance of 0.3 µm from the interface P1 toward the surface side of the coating, the titanium compound layer is composed of a plurality of titanium compound particles;

the titanium compound particles are one selected from the group consisting of TiCN particles. TiCNO particles. TiAlCN particles and TiAlCNO particles:

the titanium compound layer comprises a region B1 and a region B2;

the region B1 is a region sandwiched between an imaginary plane SB2, which is located at a distance of 0.5 µm from the interface P1 toward the base material side, and an imaginary plane SB3, which is located at a distance of 1.0 µm from the interface P1 toward the base material side;

the region B2 is a region sandwiched between the interface P1 and an imaginary plane SB1 that is located at a distance of 0.3 µm from the interface P1 toward the base material side;

an average particle diameter a1 of the $\alpha$-$Al_2O_3$ particles in the region A1, an average particle diameter a2 of the $\alpha$-$Al_2O_3$ particles in the region A2, an average particle diameter b1 of the titanium compound particles in the region B1, and an average particle diameter b2 of the titanium compound particles in the region B2 satisfy relationships represented by respective expressions 1 to 3:

$$0.80 \leq a2/b2 \leq 1.27 \qquad \text{Expression 1}$$

$$1.50 \leq a1/a2 \leq 10 \qquad \text{Expression 2}$$

$$1.45 \leq b1/b2 \leq 5; \text{ and} \qquad \text{Expression 3}$$

the average particle diameter b1 is 0.10 µm or more and 0.50 µm or less.

The cutting tool of the present disclosure is a cutting tool comprising an a-$Al_2O_3$ layer as a coating and can have a long tool life.

(2) It is preferred that:

a ratio R1/R2 between a ratio R1 of the number of carbon atoms relative to the total number of carbon, nitrogen and oxygen atoms in the region B1 and a ratio R2 of the number of carbon atoms relative to the total number of carbon, nitrogen and oxygen atoms in the region B2 is 0.9 or more and 1.1 or less;

a ratio R3 of the total number of carbon and nitrogen atoms relative to the total number of carbon, nitrogen and oxygen atoms in the region B is 0.8 or more and 1.0 or less; and a ratio R4 of the total number of carbon and nitrogen atoms relative to the total number of carbon, nitrogen and oxygen atoms in the region B2 is 0.8 or more and 1.0 or less.

This results in substantially uniform composition throughout the titanium compound layer, which inhibits occurrence of interfaces in the inside of the titanium compound layer due to change in composition. Therefore, cracks starting from the interfaces in the coating are inhibited from occurring, so that the cutting tool is improved in peeling resistance.

(3) It is preferred that:

a ratio alibi of the average particle diameter a1 to the average particle diameter b is 1.50 or more and 5 or less; and the average particle diameter a1 is 0.40 µm or more and 1.00 µm or less.

This results in improvement in breakage resistance of the cutting tool.

(4) It is preferred that:

an average thickness of the titanium compound layer is 1.0 µm or more and 15 µm or less; and an average thickness of the $\alpha$-$Al_2O_3$ layer is 1.0 µm or more and 15 µm or less.

This results in improvement in wear resistance, breakage resistance and peeling resistance of the cutting tool.

(5) The $\alpha$-$Al_2O_3$ layer preferably has a TC (0 0 12) of 3 or more in an orientation index TC (hkl).

This enables the $\alpha$-$Al_2O_3$ layer to have an excellent wear resistance. Accordingly, the cutting tool can have a long tool life.

(6) The coating preferably comprises a TiN layer arranged between the base material and the titanium compound layer.

This enables the coating to have excellent wear resistance and breakage resistance.

Details of Embodiments

Specific examples of the cutting toot of the present disclosure will be described below with reference to the drawings. In the drawings of the present disclosure, the same reference signs refer to the same parts or equivalent parts. The dimensional relationships among length, width, thickness, depth and the like are changed as appropriate for the purpose of clarifying and simplifying the drawings, and do not necessarily correspond to the actual dimensional relationships.

The expression "A to B" as used herein means the upper and lower limits of the range (that is, A or more and B or less), wherein when the unit is described only for B but not for A, the unit of A is the same as that of B.

In the case of representing a compound or the like by a chemical formula in the present specification, when the atomic ratio is not particularly limited, the formula is intended to include any atomic ratio conventionally known and is not necessarily limited to that in a stoichiometric range. For example, when "TiCN" is described, the ratio of the numbers of atoms constituting TiCN includes any atomic ratio conventionally known.

In the present disclosure, when one or more numerical values are described as each of the lower limit and upper limit of one numerical range, the combination of any one numerical value described as the lower limit and any one numerical value described as the upper is intended to be also disclosed. For example, when a1 or more, b or more and c1 or more is described as the lower limit and a2 or less, b2 or less and c2 or less is described as the upper limit, a1 or more and a2 or less, a1 or more and b2 or less, a1 or more and c2 or less, b1 or more and a2 or less, b1 or more and b2 or less, b1 or more and c2 or less, c1 or more and a2 or less, c1 or more and b2 or less, and c1 or more and c2 or less are intended to be disclosed.

Embodiment 1: Cutting Tool

The cutting tool of one embodiment of the present disclosure (hereinafter also referred to as "present embodiment") is a cutting tool comprising a base material and a coating arranged on the base material; wherein:

the coating comprises a titanium compound layer arranged on the base material and an $\alpha$-Al$_2$O$_3$ layer arranged directly on the titanium compound layer.

the $\alpha$-Al$_2$O$_3$ layer is composed of a plurality of $\alpha$-Al$_2$O$_3$ particles;

the $\alpha$-Al$_2$O$_3$ layer comprises a region A1 and a region A2;

region A1 is a region sandwiched between an imaginary plane SA2, which is located at a distance of 0 0.5 μm from an interface P1 between the titanium compound layer and the $\alpha$-Al$_2$O$_3$ layer toward the surface side of the coating, and an imaginary plane SA3, which is located at a distance of 1.0 μm from interface P1 toward the surface side of the coating, region A2 is a region sandwiched between interface P1 and an imaginary plane SA1 that is located at a distance of 0.3 μm from interface P1 toward the surface side of the coating;

the titanium compound layer is composed of a plurality of titanium compound particles;

the titanium compound particles are one selected from the group consisting of TiCN particles, TiCNO particles, TiAlCN particles and TiAlCNO particles:

the titanium compound layer comprises a region B1 and a region B2;

region B1 is a region sandwiched between an imaginary plane SB2, which is located at a distance of 0.5 μm from interface P1 toward the base material side, and an imaginary plane SB3, which is located at a distance of 1.0 μm from interface P1 toward the base material side;

region B2 is a region sandwiched between interface P1 and an imaginary plane SB1 that is located at a distance of 0 3 pnm from interface P1 toward the base material side.

the average particle diameter a1 of the $\alpha$-Al$_2$O$_3$ particles in region A1, the average particle diameter a2 of the $\alpha$-Al$_2$O$_3$ particles in region A2, the average particle diameter b1 of the titanium compound particles in region B1, and the average particle diameter b2 of the titanium compound particles in region B2 satisfy the relationships represented by the expressions 1 to 3:

$$0.80 \le a2/b2 \le 1.27 \qquad \text{Expression 1}$$

$$1.50 \le a1/a2 \le 10 \qquad \text{Expression 2}$$

$$1.45 \le b1/b2 \le 5; \text{ and} \qquad \text{Expression 3}$$

average particle diameter b1 is 0.1 μm or more and 0.5 μm or less.

The cutting tool of the present disclosure is a cutting tool comprising an $\alpha$-Al$_2$O$_3$ layer as a coating and can have a long to % oi life. The reasons are not clear but are presumed to be as described below in (i) to (iv).

(i) in the cutting tool of the present embodiment, the ratio a2/b2 of average particle diameter a2 in region A2 of the $\alpha$-Al$_2$O$_3$ layer to average particle diameter b2 in region B2 of the titanium compound layer is 0.80 or more and 1.27 or less That is, the difference between average particle diameter a2 and average particle diameter b2 is small in the vicinity of the interface between the $\alpha$-Al$_2$O$_3$ layer and the titanium compound layer. Thereby, interfaces are inhibited from occurring due to the difference in particle diameter in region A2 and region B2. The coating of the cutting tool has a large adhesion between region A2 and region B2 due to the interfaces, which is the starting point of cracks, being inhibited from occurring, and the cutting tool thereby has excellent peeling resistance and breakage resistance.

(ii) In the cutting tool of the present embodiment, the ratio a1/a2 of average particle diameter a1 in region A1 to average particle diameter a2 in region A2 of the a-Al$_2$O$_3$ layer is 1.50 or more, that is, average particle diameter a1 is larger than average particle diameter a2, so that cracks do not easily extend in region A1 and region A2 in the direction of the thickness of the coating and the cutting tool thereby has an excellent breakage resistance.

(iii) In the cutting tool of the present embodiment, the ratio b1/b2 of average particle diameter b1 in region B1 to average particle diameter b2 in region B2 of the titanium compound layer is 1.45 or more, that is, average particle diameter b1 is larger than average particle diameter b2, so that cracks do not easily extend in region B1 and region B2 in the direction of the thickness of the coating and the cutting tool thereby has an excellent breakage resistance. In addition, the ratio b1/b2 is 5 or less, that is, the difference between average particle diameter b1 and average particle diameter b2 is small, so that interfaces is inhibited from occurring due to the difference in particle diameter.

(iv) In the cutting tool of the present embodiment, average particle diameter b1 in region B1 of the titanium compound layer is 0.10 μm or more, so that cracks are inhibited front extending on the tool surface and the cutting tool thereby has an excellent breakage resistance Average particle diameter b1 is 0.50 μm or less, so that the titanium compound layer is improved in hardness and the cutting tool thereby has an excellent wear resistance.

<Configuration of Cutting Tool>

As shown in FIG. 1, a cutting tool 1 of the present embodiment comprises a base material 10 and a coating 15 arranged on base material 10, wherein coating 15 comprises an $\alpha$-Al$_2$O$_3$ layer 11 and a titanium compound layer 14. Coating 15 preferably coats at least a part of the portion, involved in cutting, of a rake face of the base material, preferably coats at least a part of the portion, involved in cutting, of the base material, and further more preferably coats the entire surface of the base material. The portion, involved in cutting, of the base material means a region, on the surface of the base material, which is at the distance within 1.5 mm from the ridgeline of the cutting edge. Even if a part of the base material is not coated with this coating or the configuration of the coating is partly different, it will not deviate from the scope of the present disclosure.

<Applications of Cutting Tool>

Examples of the cutting tools of the present disclosure can include a drill, an end mill (such as a ball end mill), an indexable cutting insert for a drill, an indexable cutting insert for an end mill, an indexable cutting insert for milling, an indexable cutting insert for turning, a metal saw, a gear cutting tool, a reamer and a tap.

<Base Material>

Base material 10 comprises a rake face and a flank face, and any base material of this type conventionally known may be used. For example, the base material is preferably any one of cemented carbides (for example, WC-based cemented carbides such as WC-Co-based cemented carbides; the cemented carbides can contain a carbonitride of Ti, Ta, Nb or the like), cermets (those that contain TiC, TiN, TiCN or the like as a main component), high-speed steels, ceramics (such as titanium carbide, silicon carbide, silicon nitride, aluminum nitride and aluminum oxide), cubic boron nitride sintered materials and diamond sintered materials.

Among these various base materials, it is preferable to select cemented carbides (particularly WC-based cemented carbides) or cermets (particularly TiCN-based cermets). These base materials have an excellent balance of hardness and strength at a high temperature, and have excellent properties as base materials for cutting tools for the above-described applications. When a WC-based cemented carbide is used as a base material, it may contain a free carbon and an abnormal layer such as that referred to as an η phase or an ε phase in its structure.

The surface of the base material may also be modified. For example, in the case of a cemented carbide, it may have a A-free layer formed on the surface thereof, and in the case of a cermet, it may have a hardened layer formed on the surface. The base material exhibits the desired effect even if its surface is modified.

When the cutting tool is an indexable cutting insert, the base material may or may not have a tip breaker. The ridgeline of the cutting edge used may have any shape such as a sharp edge shape (one having a ridge where a rake face and a flank face intersect), a honing shape (one having a rounded sharp edge), a negative land shape (a chamfered one), or a combination of a honing shape and a negative land shape.

<Coating>

<<Configuration of Coating>>

As shown in FIG. 1, a coating 15 comprises a titanium compound layer 14 and an $\alpha$-Al$_2$O$_3$ layer 11 arranged directly on titanium compound layer 14. The coating may comprise further layer(s) in addition to the $\alpha$-Al$_2$O$_3$ layer and the titanium compound layer.

Figure 2:
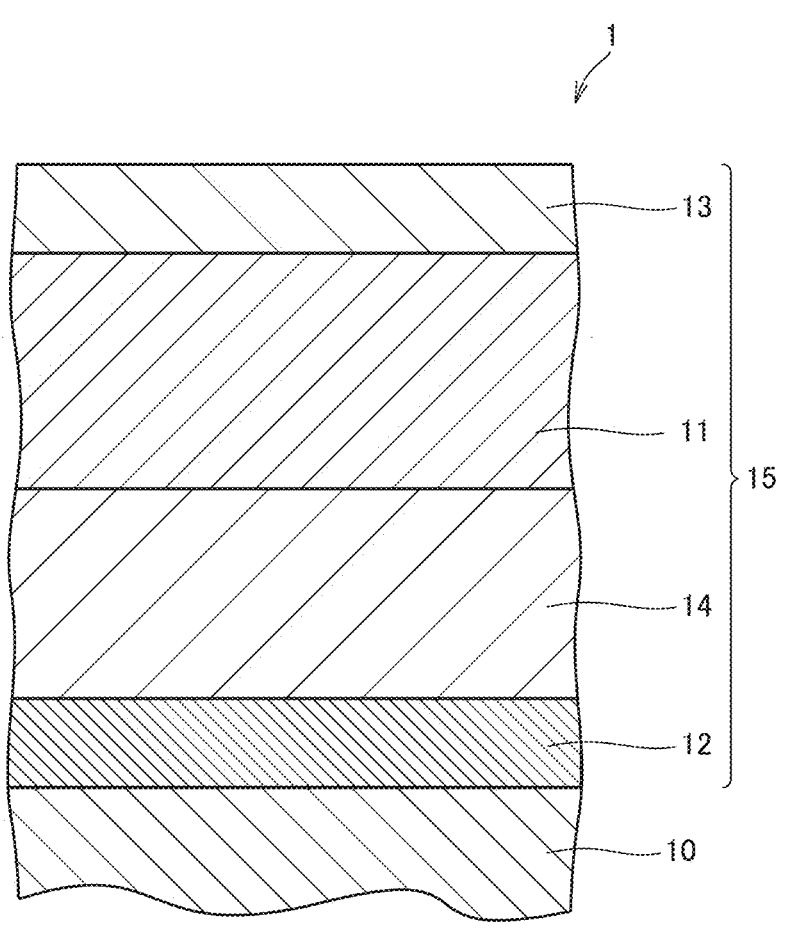
FIG. 2 is a schematic diagram showing another example of a cross section of a cutting tool according to Embodiment 1.

As shown FIG. 2, a coating 15 of a cutting tool 1 may further comprise a TiN layer 12 arranged between a base material 10 and a titanium compound layer 14. It may also comprise a surface layer 13 arranged on $\alpha$-Al$_2$O$_3$ layer 11. Details of the TiN layer and the surface layer will be described later.

The lower limit of the average thickness of the entire coating arranged on the base material is preferably 2 μm or more, 3 μm or more, 5 μm or more, 8 μm or more, 10 μm or more, 11 μm or more, 16 μm or more, 20 μm or more, or 23 μm or more, from the viewpoint of improving wear resistance. The lower limit of the average thickness of the entire coating is particularly preferably 11 μm or more, 16 μm or more, or 20 μm or more. The upper limit of the average thickness of the entire coating is preferably 23 μm or less, 20

μm or less, or 16 μm or less, from the viewpoint of improving peeling resistance. The average thickness of the entire coating is preferably 11 μm or more and 23 μm or less, 16 μm or more and 23 μm or less, or 20 μm or more and 23 μm or less.

The thickness of the coating described above is measured, for example., by obtaining a cross-sectional sample parallel to the normal direction of the surface of the base material and observing this sample with a scanning transmission electron microscope (STEM: Scanning'Transmission Electron Microscopy). Examples of the scanning transmission electron microscope include JEM-2100F (trade name) manufactured by JEOL Ltd.

As used herein, the term "thickness" means an average thickness. Specifically, the observation magnification for the cross-sectional sample is set to 5000 times, and a rectangular measured field of view that is (30 μm in the direction parallel to the surface of the base material)×(distance including the entire thickness of the coating) is set in the election microscopic image. The thickness size is measured at 10 points in the field of view, and the average value thereof is defined as "thickness". The average thickness of the $\alpha$-Al$_2$O$_3$ layer, the titanium compound layer, the TiN layer and the surface layer described below are also measured and calculated in the same manner.

It was confirmed that similar results could be obtained, even when a plurality of measured fields of view covering a coating on the rake face or a coating on the flank face were arbitrarily selected for the same specimen, the above measurement is carried out in the measured fields of view and the above average thickness is calculated.

< A-Al$_2$O$_3$ Layer>

<<Configuration of $\alpha$-Al$_2$O$_3$ Layer>>

In the present embodiment, the $\alpha$-Al$_2$O$_3$ layer is composed of a plurality of $\alpha$-Al$_2$O$_3$ (aluminum oxide having an a-type crystal structure) particles. That is, the $\alpha$-Al$_2$O$_3$ layer is composed of polycrystalline $\alpha$-Al$_2$O$_3$. The $\alpha$-Al$_2$O$_3$ layer may contain unavoidable impunities and the like as long as they exhibit the effects of the present embodiment. Examples of the unavoidable impurities include chlorine (Cl). The content of the unavoidable impurities in the $\alpha$-Al$_2$O$_3$ layer is preferably 3% by mass or less. The content of the unavoidable impurities in the $\alpha$-Al$_2$O$_3$ layer is measured by secondary ion mass spectrometry (SIMS).

As shown in FIG. 1, $\alpha$-Al$_2$O$_3$ layer 11 comprises a region A1 and a region A2. Region A1 and region A2 are defined herein as the following regions.

Region A1 is a region sandwiched between imaginary plane SA2, which is located at a distance of 0 5 μm from an interface P1 between the titanium compound layer 14 and the $\alpha$-Al$_2$O$_3$ layer 11 toward the side of surface P2 of coating 15, and imaginary plane SA3, which is located at a distance of 1.0 μm from the interface P1 toward the side of surface P2 of coating 15, imaginary plane SA2 and imaginary plane SA3 are included in region A1.

Region A2 is a region sandwiched between the interface P1 and imaginary plane SA1 that is located at a distance of 0 3 μm from the interface P1 toward the side of surface P2 of the coating 15. Imaginary plane SA1 is included in region A2, but interface P1 is not included in region A2.

<<Average Particle Diameter of $\alpha$-Al$_2$O$_3$ Particles>>

In the present embodiment, the lower limit of average particle diameter a1 of the $\alpha$-Al$_2$O$_3$ particles in region A1 is preferably 0.40 μm or more, 0.42 μm or more, 0.45 μm or more, or 0.50 μm or more, from the viewpoint of inhibiting cracks from extending from the tool surface and improving breakage resistance. The upper limit of average particle diameter a1 is preferably 1.00 μm or less, 0.95 μm or less, 0.90 μm or less, 0.85 μm or less, or 0.80 μm or less, from the viewpoint of inhibiting interfaces from occurring due to the difference in particle diameter between average particle diameter a1 and average particle diameter a2 of the α-Al$_2$O$_3$ particles in region A2; inhibiting cracks from extending from the interfaces; and improving breakage resistance. Average particle diameter a1 is preferably 0.40 μm or more and 1.00 μm or less, 0.45 μm or more and 0.90 μm or less, or 0.50 μm or more and 0.80 μm or less.

In the present embodiment, the lower limit of average particle diameter a2 of the α-Al$_2$O$_3$ particles in region A2 is preferably 0.05 μm or more, 0.06 μm or more, 0.09 μm or more, 0.10 μm or more, or 0.15 μm or more, from the viewpoint of improving adhesion with the titanium compound layer. The upper limit of average particle diameter a2 is preferably 0.30 μm or less, 0.28 μm or less, or 0.25 μm or less, from the viewpoint of improving hardness. Average particle diameter a2 is preferably 0.05 μm or more and 0.30 μm or less, 0.10 μm or more and 0.28 μm or less, or 0.15 μm or more and 0.25 μm or less.

In the present embodiment, the ratio a1/a2 of average particle diameter a1 to average particle diameter a2 is 1.50 or more and 10 or less. Such a cutting tool can have an excellent breakage resistance. The lower limit of the ratio a1/a2 is 1.50 or more, and preferably 2.00 or more, 2.50 or more, 2.67 or more, 3.00 or more, 3.33 or more, or 3.50 or more. The upper limit of the ration a1/a2 is 10 or less, and preferably 9.00 of less, 8.89 or less, 8.00 or less, 7.00 or less, 6.67 or less, or 6.00 or less. The ratio a1,a2 is preferably 2.00 or more and 10 or less, 2.50 or more and 8.00 or less, or 3.50 or more and 6.00 or less.

In the present specification, average particle diameter a1 and average particle diameter a2 are measured according to the following procedures (A1) to (A6).

(A1) A cutting tool is cut out with a diamond wire along the normal line of a rake face of a base material to expose a cross section of an α-Al$_2$O$_3$ layer. The exposed cross section is subjected to Ar ion milling to make the cross section in a mirror surface state. The conditions for the ion milling are as follows.

Accelerating Voltage: 6 kV.

Irradiation angle: 0° from the linear direction parallel to the thickness direction of the α-Al$_2$O$_3$ layer in the cross section of the α-Al$_2$O$_3$ layer irradiation time: 6 hours.

Figure 3:
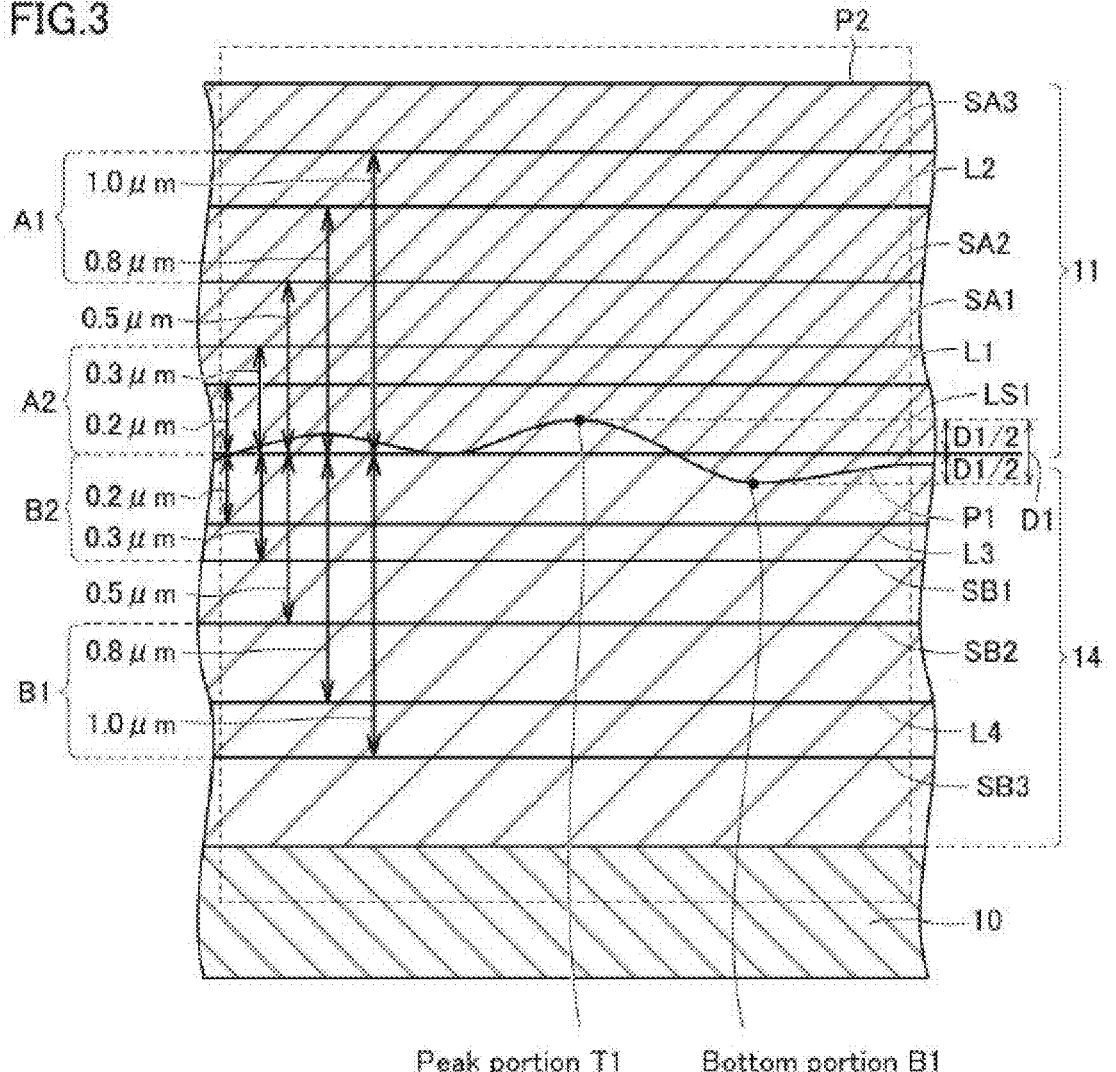
FIG. 3 is a diagram illustrating a method for measuring the particle diameter of an α-Al$_2$O$_3$ particle and the particle diameter of a titanium compound particle.

(A2) The cross section in a mirror surface state is observed with a field-emission scanning electron microscope (EF-SEM) at a magnification of 5000 times to obtain a backscattered electron image (EBSD). FIG. 3 is a diagram schematically showing a method for measuring the particle diameter of an α-Al$_2$O$_3$ particle, and schematically shows one example of the cross section of the particle.

(A3) In the above EBSD, a region where a deterrence D1, of the distances along the normal direction of the rake face, between a bottom portion B1 and a peak portion T1 of the irregularities of interface P1 on the base material side of the α-Al$_2$O$_3$ layer is 0.5 μm or less is identified, and the measurement range is set so that it includes the region. The measurement range is a rectangle that is (the horizontal direction (the direction parallel to the rake face): 30 μm)×(the vertical direction (normal direction of the rake face), length including the entire coating).

(A4) A reference line LS1 is set at a position intermediate between bottom portion B1 and peak portion T1 of interface P1 within the above measurement range.

(A5) The horizontal particle diameters of the α-Al$_2$O$_3$ particles are measured on a line L1 0.2 μm away from reference line LS1 toward the direction of the surface of the cutting tool. The particle diameters of all the α-Al$_2$O$_3$ particles in the measurement range are measured, and the average value thereof is taken as the average particle diameter a2 of the α-Al$_2$O$_3$ particles in region A2.

(A6) The horizontal particle diameters of the α-Al$_2$O$_3$ particles are measured on a line L2 0.8 ρm away from reference line LS1 toward the direction of the surface of the cutting tool. The particle diameters of all the α-Al$_2$O$_3$ particles in the measurement range are measured, and the average value thereof is taken as average particle diameter a1 of the α-Al$_2$O$_3$ particles in region A1.

Figure 4:
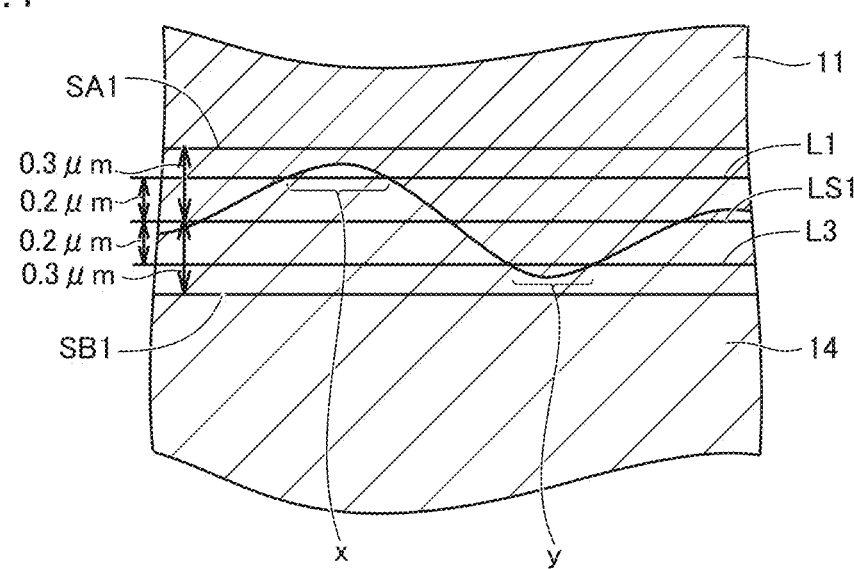
FIG. 4 is a diagram illustrating a method for measuring the particle diameter of an α-Al$_2$O$_3$ particle and the particle diameter of a titanium compound particle.

In the above (A5), when the difference between bottom portion B1 and peak portion T1 of the interface is large (for example, more than 0.5 μm) and line L1 also exists inside titanium compound layer 14 as shown in FIG. 4, the particle diameters of the α-Al$_2$O$_3$ particles are measured not on line L1 inside titanium compound layer 14 (for example, in a region represented by X in FIG. 4) but the particle diameters of the α-Al$_2$O$_3$ particles are measured only for the inside of the α-Al$_2$O$_3$ layer. The average particle diameter a2 is then calculated.

In setting line L1, the present inventors set a plurality of measurement lines passing through positions at intervals of 0.05 μm within a range that is at a distance of 0 μm or more and 0.3 μm or less from reference line LS1 (for example, a line at a distance of 0.05 μm from reference line LS1, a line at a distance of 0.10 μm from reference line LS1 and a line at a distance of 0.15 μm from reference line LS1) along the normal direction of the rake face in region A2, measured the particle diameters of all the α-Al$_2$O$_3$ particles in the measurement range on each line; and calculated the average value thereof. As a result, it was confirmed that the average particle diameter of the α-Al$_2$O$_3$ particles on the line corresponding to line L1, which is located at a distance of 0.2 μm from reference line LS1, is substantially the same as the average particle diameter of the α-Al$_2$O$_3$ particles on the plurality of measurement lines. This is presumed to be because nucleation in the initial stage is greatly affected by the orientation and irregularities of the underlayer and Al$_2$O$_3$ crystals thereby grow not in a columnar shape (or in a shape in which the cross-sectional particle diameter increases toward the surface but in a granular shape (they are grown evenly to some extent perpendicularly and parallel to the interface). From the above, the average particle diameter of the α-Al$_2$O$_3$ particles on line L1 can be taken as average particle diameter a2 of the α-Al$_2$O$_3$ particles in region A2.

It was confirmed that the similar results could be obtained even if different measurement ranges were arbitrarily selected for the same cutting tool and the above measurement was carried out in the measurement range. In addition, it was confirmed that the similar results could be obtained even if different measurement ranges were arbitrarily selected for the different cutting tool and the above measurement was carried out in the measurement range.

In setting line L2, the present inventors set a plurality of measurement lines passing through positions at intervals of 0.05 μm within a range that is at a distance of 0.5 μm or more and 1.0 μm or less from reference line LS1 (for example, a line at a distance of 0.50 μm from reference line LS1, a line at a distance of 0.55 μm from reference line LS1: and a line at a distance of 0.60 μm from reference line LS1) along the normal direction of the rake face in region A1; measured the particle diameters of all the $\alpha\text{-Al}_2\text{O}_3$ particles in the measurement range on each line: and calculated the average value thereof. As a result, it was confirmed that the average particle diameter of the $\alpha\text{-Al}_2\text{O}_3$ particles on the line corresponding to line L2, which is located at a distance of 0.8 μm from reference line LS1, is substantially the same as the average particle diameter of the $\alpha\text{-Al}_2\text{O}_3$ particles on the plurality of measurement lines. This is presumed to be for the following reasons.

Region A1 is a transition region from nucleation to crystal growth, in region A2, nucleation occurred under the influence of the orientation, irregularities and the like of the base material in addition to the gas conditions, but in region A1, the influence of gas conditions predominates and the nucleus different (in orientation, shape and the like) from that in region A2 predominates. It is presumed that the total number of particles does not change significantly and the change in the particle diameter is not large, because the crystals produced by nucleation are weeded out while stable nuclei are generated under new gas conditions. In addition, in the present embodiment, the gas conditions during forming region A2 and region A1 are adjusted to gently transition between weeding-out and nucleation of crystals, thereby extending region A1 in the thickness direction and maintaining the particle diameter. From the above, the average particle diameter of the $\alpha\text{-Al}_2\text{O}_3$ particles on line L2 can be taken as average particle diameter a1 of the $\alpha\text{-Al}_2\text{O}_3$ particles in region A1.

It was confirmed that the similar results could be obtained even if different measurement ranges were arbitrarily selected for the same cutting tool and the above measurement was carried out in the measurement range. In addition, it was confirmed that the similar results could be obtained even if different measurement ranges were arbitrarily selected for the different cutting tool and the above measurement was carried out in the measurement range.

<<Average Thickness of $\alpha\text{-Al}_2\text{O}_3$ Layer>>

In the present embodiment, the average thickness of the $\alpha\text{-Al}_2\text{O}_3$ layer is preferably 1.0 μm or more and 15 μm or less. This can result in both excellent wear resistance and breakage resistance at the same time. The lower limit of the average thickness of the $\alpha\text{-Al}_2\text{O}_3$ layer is preferably 1.0 μm or more, 2.0 μm or more, 3.0 μm or more, or 5.0 μm or more, from the viewpoint of improving wear resistance. The upper limit of the average thickness of the $\alpha\text{-Al}_2\text{O}_3$ layer is preferably 15 μm or less, 10 μm or less, 9 μm or less, or 8 μm or less, from the viewpoint of improving breakage resistance. The average thickness of the $\alpha\text{-Al}_2\text{O}_3$ layer is preferably 1.0 μm or more and 15 μm or less, 2.0 μm or more and 10 μm or less, 3.0 μm or more and 9 μm or less, or 5.0 μm or more and 8 μm or less.

As described above, the thickness of the $\alpha\text{-Al}_2\text{O}_3$ layer can be checked by observing a cross-sectional sample of the cutting tool with a scanning transmission electron microscope (STEM) or the like. Then, the observation field of view is the measurement range set in measuring the particle diameter of the $\alpha\text{-Al}_2\text{O}_3$ particles as described above.

It was confirmed that similar results were obtained, even when a plurality of measurement ranges covering a coating on the rake face or a coating on the flank face were arbitrarily selected for the same specimen and the above measurement was carried out for each of the measurement ranges.

<<Orientation index of $\alpha\text{-Al}_2\text{O}_3$ particles>>

In the present embodiment, the $\alpha\text{-Al}_2\text{O}_3$ layer preferably has a TC (0 0 12) of 3 or more in an orientation index TC (hkl) represented by the following expression (1). The $\alpha\text{-Al}_2\text{O}_3$ layer having such a TC (0 0 12) can have excellent wear resistance. Accordingly, the cutting tool can have a long tool life.

[Expression 1]

$$TC(hkl) = \frac{I(hkl)}{I_0(hkl)} \left\{ \frac{1}{n} \sum_{1}^{n} \frac{I(hkl)}{I_0(hkl)} \right\}^{-1} \qquad (1)$$

In the expression (1), I (hkl) represents the X-ray diffraction intensity on the reflection plane (hkl), and $I_0$ (hkl) represents the standard intensity according to the PDF card No. 00-010-0173 of ICDD. In the expression (1), n represents the number of reflections used in the calculation and is 8 in the present embodiment. The planes (hkl) used for reflection are (012), (104), (110), (0 0 12), (113), (024), (116) and (300).

ICDD (registered trademark) is an abbreviation for International Centre for Diffraction Data. PDF (registered trademark) is an abbreviation for Powder Diffraction File.

TC (0 0 12) of the $\alpha\text{-Al}_2\text{O}_3$ layer of the present embodiment can be represented by the following expression (2).

[Expression 2]

$$TC(0\ 0\ 12) = \frac{I(0\ 0\ 12)}{I_0(0\ 0\ 12)} \left\{ \frac{1}{8} \sum_{1}^{8} \frac{I(hkl)}{I_0(hkl)} \right\}^{-1} \qquad (2)$$

Accordingly, "TC (0 0 12) of 3 or more in the orientation index TC (hkl)" means that the numerical value determined by the above expression (2) obtained by substituting TC (0 0 12) into the above expression (1) is 3 or more.

The value of TC (0 0 12) is more preferably 4 or more and further preferably 5 or more. The larger the value of TC (0 0 12) is, the more effectively the wear resistance can be improved. The upper limit of the value of TC (0 0 12) is not limited, but since eight reflection planes are used in the calculation, it may be set to 8 or less. The value of TC (0 0 12) can be set to 3 or more and 8 or less, 4 or more and 8 or less, or 5 or more and 8 or less.

In the present disclosure, the $\alpha\text{-Al}_2\text{O}_3$ layer preferably has a TC (110) of 2 or more in an orientation index TC (hkl) represented by the above expression (1). The $\alpha\text{-Al}_2\text{O}_3$ layer having such a TC (110) can have excellent breakage resistance. Accordingly, the cutting tool can have a long tool life.

TC (110) of the $\alpha\text{-Al}_2\text{O}_3$ layer of the present embodiment can be represented by the following expression (3).

[Expression 3]

$$TC(110) = \frac{I(110)}{I_0(110)} \left\{ \frac{1}{8} \sum_{1}^{8} \frac{I(hkl)}{I_0(hkl)} \right\}^{-1} \qquad (3)$$

Accordingly, "TC (110) of 2 or more in the orientation index TC (hkl)" means that the numerical value determined by the above expression (3) obtained by substituting TC (110) into the above expression (1) is 2 or more.

The value of TC (110) is more preferably 2.5 or more and further preferably 3 or more. The larger the value of TC (110) is, the more effectively the breakage resistance can be improved. The upper limit of the value of TC (110) is not limited, but since eight reflection planes are used in the calculation, it may be set to 8 or less. The value of TC (110)

can be set to 2 or more and 8 or less, 2.5 or more and 8 or less, or 3 or more and 8 or less.

The TC (hkl) measurement as described above can be performed by analysis with an X-ray diffractometer. TC (hkl) can be measured, for example, using SmartLb/a (registered trademark) (scan speed 21.7°/min; step, 0.01°; scan range: 15 to 140°) manufactured by Rigaku Corporation under the following conditions. In the present embodiment, the measurement results of TC (hkl) with the X-ray diffractometer are referred to as "XRD results".

Characteristic X-ray: Cu-Kα

Tube voltage 45 kV

Tube current: 200 mA

Filter: multi-layer mirror

Optical system, concentration method

X-Ray diffraction method: 0-20 method

When using the X-ray diffractometer, the flank face of the cutting tool is irradiated with X-rays. Usually, the rake face has irregularities formed thereon, whereas the flank face has a flat surface. Therefore, it is preferable to irradiate the flank face with X-rays in order to eliminate disturbance factors. The flank face is irradiated with X-rays particularly on an area that extends in a range of about 2 to 4 mm from a ridgeline of a cutting edge. This results in a high reproducibility, in the present embodiment, the values of TC (hkl) of the α-Al$_2$O$_3$ layer on the flank face of the base material are the same as the values of TC (hkl) of the α-Al$_2$O$_3$ layer on the rake face of the base material.

It was confirmed that the similar results were obtained even if a plurality of measurement points are arbitrarily selected for the same specimen and the above measurement was carried out for each of the measurement points.

<Titanium Compound Layer>

<<Configuration of Titanium Compound Layer>>

In the present embodiment, the titanium compound layer is composed of a plurality of titanium compound particles, and the titanium compound particles are one selected from the group consisting of TiCN particles, TiCNO particles, TiAlCN particles and TiAlCNO particles. That is, the titanium compound layer is composed of a polycrystalline titanium compound. The titanium compound layer may contain unavoidable impurities and the like as long as the effects of the present embodiment is exhibited. Examples of the unavoidable impurities include chlorine (Cl). The content of the unavoidable impurities in the titanium compound layer is preferably 3% by mass or less. The content of the unavoidable impurities in the titanium compound layer is measured by secondary ion mass spectrometry (SIMS).

As shown in FIG. 1, titanium compound layer 14 comprises region B1 and region B2. Region B1 and region B2 are defined herein as the following regions.

Region B1 is a region sandwiched between imaginary plane SB2, which is located at a distance of 0.5 μm from interface P1 toward the side of base material 10 and imaginary plane SB3, which is located at a distance of 1.0 μm from interface P1 toward the side of base material 10. Imaginary plane SB2 and imaginary plane SB3 are included in region B1.

Region B2 is a region sandwiched between interface P1 and imaginary plane SB1 that is located at a distance of 0 3 m from interface P1 toward base material 10. Imaginary plane SB1 is included in region B2, but interface P1 is not included in region B2.

<<Average Particle Diameter of Titanium Compound Panicles>>

In the present embodiment, average particle diameter b1 of the titanium compound particles in region B1 is 0.10 μm or more and 0.50 μm or less. Such a cutting tool can have excellent, breakage resistance and wear resistance. The lower limit of average particle diameter b1 is 0.10 μm or more, and preferably 0.15 μm or more, 0.17 μm or more, or 0.20 μm or more, from the viewpoint of improving breakage resistance. The upper limit of average particle diameter b1 is 0.50 μm or less, and preferably 0.45 μm or less, 0.40 μm or less, 0.35 μm or less, or 0.32 μm or less, from the viewpoint of improving wear resistance Average particle diameter b1 is preferably 0.15 μm or more and 0.50 μm or less, 0.20 μm or more and 0.40 μm or less, or 0.20 μm or more and 0.32 μm or less.

In the present embodiment, the lower limit of average particle diameter b2 of the titanium compound particle in region B2 is preferably 0.05 μm or more, 0.06 μm or more, 0.08 μm or more, or 0.10 μm or more, from the viewpoint of improving adhesion with the α-Al$_2$O$_3$ layer. The upper limit of average particle diameter b2 is preferably 0.22 μm or less, or 0.20 μm or less, from the viewpoint of improving hardness. Average particle diameter b2 is preferably 0.05 μm or more and 0.22 μm or less, 0.06 μm or more and 0.20 μm or less, or 0.10 μm or more and 0.20 μm or less.

In the present embodiment, the ratio b1/b2 of average particle diameter b1 to average particle diameter b2 is 1.45 or more and 5 or less. Such a cutting tool can have an excellent breakage resistance. The lower limit of the ratio b1/b2 is 1.45 or more, and preferably 1.50 or more, 1.60 or more, 1.67 or more, 1.70 or more, or 2.00 or more. The upper limit of the ratio b1/b2 is 5 or less, and preferably 4.50 or less, 4.00 or less, 3.50 or less, or 3.33 or less. The ratio b1/b2 is preferably 1.50 or more and 5 or less, or 2.00 or more and 4.00 or less.

In the present specification, average particle diameter b1 and average particle diameter b2 are measured according to the following procedures (B1) to (B3).

(B1) The procedures similar to procedures (A1) to (A4) described in the method for measuring average particle diameter a1 and average particle diameter a2 is performed to set reference line LS1 in the measurement range of the EBSD image.

(B2) The lateral particle diameters of the titanium compound particles are measured on a line L3 0.2 μm away from reference line LS1 toward to the direction of the base material of the cutting tool. The particle diameters of all the titanium compound particles in the measurement range are measured, and the average value thereof is taken as average particle diameter b2 of the titanium compound particles in region B2.

(B3) The lateral particle diameters of the titanium compound particles are measured on a line L4 0.8 μm away from reference line LS1 toward to the direction of the base material of the cutting tool. The particle diameters of all the titanium compound particles in the measurement range are measured, and the average value thereof is taken as average particle diameter b1 of the titanium compound particles in region B1.

In the above (B3), when the difference between a bottom portion B1 and a peak portion Ti of the interface is large (for example, more than 0.5 μm) and line L3 also exists inside α-Al$_2$O$_3$ layer 11 as shown in FIG. 4, the particle diameters of the titanium compound particles are not measured on line L3 inside α-Al$_2$O$_3$ layer 11 (for example, in a region represented by y in FIG. 4) but only for the inside of the titanium compound layer Average particle diameter b2 is then calculated.

In setting line L3, the present inventors set a plurality of measurement lines passing through positions at intervals of 0.05 μm within a range that is at a distance of 0 μm or more and 0.3 μm or less from reference line LS1 (for example, a line at a distance of 0.05 μm from reference line LS1; a line at a distance of 0.10 μm from reference line LS1; and a line at a distance of 0.15 μm from reference line LS1) along the normal direction of the rake face in region B2; measured the particle diameters of all the titanium compound particles in the measurement range on each line; and calculated the average value thereof. As a result, it was confirmed that the average particle diameter of the titanium compound particles on the line corresponding to line L3, which is located at a distance of 0.2 μm from reference line LS1, is substantially the same as the average particle diameter of the titanium compound particles on the plurality of measurement lines. This is presumed to be for the following reasons.

Region B2 is a transition region from nucleation to crystal growth in region B1, nucleation occurs under the influence of the orientation of the underlayer, irregularities and the like in addition to the gas conditions, but in region B2, the influence of gas conditions predominates and the nucleus different (in orientation, shape and the like) from that in region B1 predominates. It is presumed that the total number of particles does not change significantly and the change in the particle diameter is not large, because the crystals produced by nucleation are weeded out while stable nuclei are generated under new gas conditions. In addition, in the present embodiment, the gas conditions during forming region B1 and region B2 are adjusted to gently transition between weeding-out and nucleation of crystals, thereby extending region B2 in the thickness direction and maintaining the particle diameter From the above, the average particle diameter of the titanium compound particles on line L3 can be taken as average particle diameter b2 of the titanium compound particles in region B2.

It was confirmed that the similar results were obtained even if different measurement ranges were arbitrarily selected for the same cutting tool and the above measurement was carried out for each of the measurement ranges. In addition, it was confirmed that the similar results could be obtained even if different measurement ranges were arbitrarily selected for the different cutting tool and the above measurement was carried out in the measurement range.

In setting line L4, the present inventors set a plurality of measurement lines passing through positions at intervals of 0.05 μm within a range that is at a distance of 0.5 μm or more and 1.0 μm or less from reference line LS1 (for example, a line at a distance of 0.50 μm from reference line LS1; a line at a distance of 0.55 μm from reference line LS1; and a line at a distance of 0 60 μm from reference line LS1) along the normal direction of the rake face in region B1; measured the particle diameters of all the titanium compound particles in the measurement range on each line: and calculated the average value thereof. As a result, it was confirmed that the average particle diameter of the titanium compound particles on the line corresponding to line L4, which is located at a distance of 0.8 μm from reference line LS1, is substantially the same as the average particle diameter of the titanium compound particles on the plurality of measurement lines. This is presumed to be because nucleation in the initial stage is greatly affected by the orientation and irregularities of the underlayer and titanium compound crystals thereby grow not in a columnar shape (or in a shape in which the cross-sectional particle diameter increases toward the surface) but in a granular shape (they are grown evenly to some extent perpendicularly and parallel to the interface). From the above, the average particle diameter of the titanium compound particles on line L4 can be taken as average particle diameter b1 of the titanium compound particles in region B1.

It was confirmed that the similar results were obtained even if different measurement ranges were arbitrarily selected for the same cutting tool and the above measurement was carried out for each of the measurement ranges. In addition, it was confirmed that the similar results were obtained even if different measurement ranges were arbitrarily selected for the different cutting tool and the above measurement was carried out for each of the measurement ranges.

<<Composition of Titanium Compound Layer>>

In the present embodiment, it is preferred that the ratio R1, R2 between the ratio R1 of the number of carbon atoms relative to the total number of carbon, nitrogen and oxygen atoms in region B1 and the ratio R2 of the number of carbon atoms relative to the total number of carbon, nitrogen and oxygen atoms in region B2 is 0.9 or more and 1.1 or less, the ratio R3 of the total number of carbon and nitrogen atoms relative to the total number of carbon, nitrogen and oxygen atoms in region B1 is 0.8 or more and 1.0 or less; and the ratio R4 of the total number of carbon and nitrogen atoms relative to the total number of carbon, nitrogen and oxygen atoms in region B2 is 0.8 or more and 1.0 or less. This results in substantially uniform composition throughout the titanium compound layer, which inhibits interfaces from occurring in the inside of the titanium compound layer due to change in composition. Therefore, cracks starting from the interfaces in the coating are inhibited from occurring, so that the cutting tool is improved in breakage resistance.

The lower limit of the above R1 is preferably 0.4 or more, 0.45 or more, or 0.5 or more. The upper limit of the above R1 is preferably 0.7 or less, 0.65 or less, or 0.6 or less. The above R1 is preferably 0.4 or more and 0.7 or less, 0.45 or more and 0.65 or less, or 0.5 or more and 0.6 or less.

The lower limit of the above R2 is preferably 0.3 or more, 0.35 or more, or 0.4 or more. The upper limit of the above R1 is preferably 0.6 or less, 0.55 or less, or 0.5 or less. The above R1 is preferably 0.3 or more and 0.6 or less, 0.35 or more and 0.55 or less, or 0.4 or more and 0.5 or less.

The lower limit of the above R1/R2 is preferably 0.9 or more, or 0.95 or more. The upper limit of the above R1/R2 is preferably 1.1 or less, or 1.05 or less. The above ratio R1/R2 is preferably 0.9 or more and 1.1 or less, or 0.95 or more and 1.05 or less.

The lower limit of the above R3 is preferably 0.8 or more, 0.85 or more, or 0.87 or more. The upper limit of the above R3 is preferably 1.0 or less, 0.95 or less, or 0.92 or less. The above R3 is preferably 0.8 or more and 1.0 or less, 0.85 or more and 0.95 or less, or 0.87 or mote and 0.92 or less.

The lower limit of the above R4 is preferably 0.8 or more, 0.85 or more, or 0.87 or more. The upper limit of the above R4 is preferably 1.0 or less, 0.95 or less, or 0.92 or less. The above R4 is preferably 0.8 or more and 1.0 or less, 0.85 or more and 0.95 or less, or 0.87 or more and 0.92 or less.

In the present specification, R1, R2, R3 and R4 are measured according to the following procedures (C1) to (C4).

(C1) A cutting tool is cut out with a diamond wire along the normal line of a rake face of a base material to prepare a sample of a thin piece (with a thickness of about 100 nm) having a cross section of a titanium compound layer exposed. The exposed cross section is subjected to focused ion beam machining (hereinafter also referred to as "FIB processing") to make the cross section in a mirror surface state.

(C2) The cross section subjected to FIB processing is observed with a scanning transmission electron microscope (STEM) to identify the titanium compound layer. The observation magnification is set to 500,000 times. A BF-STEM image of the titanium compound layer is obtained Region B1 and region B2 are identified in the BF-STEM image. Identification of region B1 and region B2 in the RF-STEM image is performed by grain boundary analysis with EBSD.

A rectangular measurement field of 100 nm×100 nm is set for each of region B1 and region B2. When the applicant has carried out the measurement, it has been confirmed that as long as the measurement fields are located within region B1 or B2, even if a rectangular analysis is carried out for each of different measurement fields, there is almost no variation in measurement results, so that it will not be arbitrary even if any measurement points are set arbitrarily.

(C3) The above measurement field is subjected to a rectangular analysis with EDX attached to STEM to determine the composition. The beam diameter for the rectangular analysis is set to 0.5 nm or less, and the scanning interval is set to 0.5 nm.

From the results of the rectangular analysis, the following ratios are calculated: the ratio of the number of carbon atoms relative to the total number of carbon, nitrogen and oxygen atoms in the measurement field set in region B1 (hereinafter also referred to as R1'); the ratio of the number of carbon atoms relative to the total number of carbon, nitrogen and oxygen atoms in the measurement field set in region B2 (hereinafter also referred to as R2'); the ratio of the number of carbon and nitrogen atoms relative to the total number of carbon, nitrogen and oxygen atoms in the measurement field set in region B1 (hereinafter also referred to as R3'), and the ratio of the number of carbon and nitrogen atoms relative to the total number of carbon, nitrogen and oxygen atoms in the measurement field set in region B2 (hereinafter also referred to as R4').

(C4) The measurements for each of the above R1', R2', R3' and R4' are carried out for five different measurement fields. The average value of R1' values in the five measurement fields is taken as R1 in region B1. The average value of R2' values in the five measurement fields is taken as R2 in region B2. The average value of R3' values in the five measurement fields is taken as R3 in region B1. The average value of R4' values in the five measurement fields is taken as R4 in region B2.

When the applicant has carried out the measurement, it has been confirmed that even if the measurement fields are arbitrarily selected, there is almost no variation in measurement results, so that it will not be arbitrary even if any measurement points are set arbitrarily.

<<Average Thickness of Titanium Compound Layer>>

In the present embodiment, the average thickness of the titanium compound layer is preferably 1.0 μm or more and 15 μm or less. This can result in both excellent wear resistance and breakage resistance at the same time. The lower limit of the average thickness of the titanium compound layer is preferably 1.0 μm or more, 2.0 μm or more, 3.0 μm or more, or 5.0 μm or more, from the viewpoint of improving wear resistance. The upper limit of the average thickness of the titanium compound layer is preferably 15 μm or less, 10 μm or less, 9 μm or less, or 8 μm or less, from the viewpoint of improving breakage resistance. The average thickness of the titanium compound layer is preferably 1.0 μm or more and 15 μm or les 2.0 μm or more and 10 μm or less, 3.0 μm or more and 9 μm or less, or 5.0 μm or more and 8 μm or less.

The thickness of the titanium compound layer can be checked by observing a cross-sectional sample of the cutting tool with a scanning transmission electron microscope (STEM) or the like. Then, the observation field of view is the measurement range set in measuring the particle diameter of the titanium compound particles as described above.

It was confirmed that similar results were obtained, even when a plurality of measurement ranges covering a coating on the rake face or a coating on the flank face were arbitrarily selected for the same specimen and each of the measurement ranges was subjected to the above measurement.

< a2/b2>

In the present embodiment, the ratio a2/b2 of average particle diameter a2 to average particle diameter b2 is 0.80 or more and 1.27 or less. Such a cutting tool can have excellent peeling resistance and breakage resistance. The lower limit of the ratio a2/b2 is 0.80 or more, and preferably 0.90 or more, or 1.00 or more. The upper limit of the ratio a2/b2 is 1.27 or less, and preferably 1.20 or less, 1.15 or less, 1.13 or less, or 110 or less. The ratio a2/b2 is preferably 0.90 or more and 1.15 or less, or 1.00 or more and 1.10 or less.

< a1/b1>

In the present embodiment, the ratio a1/b1 of average particle diameter a1 to average particle diameter b1 is preferably 1.50 or more and 5 or less. This results in improvement in breakage resistance of the cutting tool. The lower limit of the ratio a1/b1 is 1.50 or more, and preferably 2.00 or more, 2.27 or more, 2.33 or more, or 2.50 or more. The upper limit of the ratio a1/b1 is 5 or less, and preferably 4.50 or less, 4.00 or less, 3.50 or less, or 3.00 or less. The ratio a1/b1 is preferably 2.00 or more and 4.50 or less, or 2.50 or more and 4.00 or less.

<Further Layers>

The coating may comprise further layer(s) in addition to the α-$Al_2O_3$ layer and the titanium compound layer. As shown in FIG. 2, examples of the further layers include TiN layer 12, surface layer 13 and an interlayer (not shown).

<<Tin Layer>>

The TiN layer is arranged between the base material and the titanium compound layer and it corresponds to an underlayer. The TiN layer preferably has an average thickness of 0.1 μm or more and 20 μm or less. This enables the coating to have excellent wear resistance and breakage resistance. The TiN layer may be arranged directly on the base material. The TiN layer may be arranged in contact with the titanium compound layer. The TiN layer may be arranged directly on the base material and in contact with the titanium compound layer.

<<Surface Layer>>

The surface layer preferably contains, for example, any of a carbide, nitride and boride of Ti (titanium) as a main component. The surface layer is a layer arranged on the outermost surface side of the coating. However, the surface layer may not be formed at a ridgeline of a cutting edge. The surface layer is arranged, for example, directly above the α-$Al_2O_3$ layer.

The expression "contain any of a carbide, nitride and boride of Ti as a main component" means that 90% by mass or more of any of a carbide, nitride and boride of Ti is contained. It also means that the surface layer preferably comprises any of a carbide, nitride and boride of Ti except for unavoidable impurities.

Among carbide, nitride and boride of Ti, a nitride of Ti (that is, a compound represented by TiN) is particularly preferably used as a main component constituting a surface layer. Of these compounds. TiN exhibits the clearest color (exhibits a gold color). Therefore, it has an advantage that it is easy to identify the corners of the cutting insert that have been already used (identify the used area). The surface layer preferably comprises a TiN layer.

The surface layer preferably has an average thickness of 0.05 μm or more and 1 μm or less. This results in improved adhesion between the surface layer and a layer adjacent thereto. The upper limit of the average thickness of the surface layer can be 0.8 μm or less or 0.6 μm or less. The lower limit of the average thickness can be 0.1 m or more or 0.2 μm or more.

<<Interlayer>>

The interlayer is arranged between the above TiN layer and the titanium compound layer. Examples of the interlayer include a TiCN layer and a TiCNO layer different in composition from the titanium compound layer. The TiCN layer and the TiCNO layer can impart more suitable wear resistance to the coating due to their excellent wear resistance. The interlayer preferably has an average thickness of 1 μm or more and 20 μm or less. When the interlayer is formed from two or more layers the average thickness of the interlayer means the average of the total thickness of the two or more layers. The interlayer may be arranged in contact with the above TiN layer. The interlayer may be arranged in contact with the titanium compound layer. The interlayer may be arranged in contact with each of the above TiN layer and the titanium compound layer.

Embodiment 2: Manufacturing Method of Cutting Tool

The cutting tool of the present embodiment can be manufactured by Conning a coating on a base material by the chemical vapor deposition (CVD) method. Of the coating, the α-Al$_2$O$_3$ layer and the titanium compound layer can be funned, for example, by the following method. The layers of the coating other than the titanium compound layer and the α-Al$_2$O$_3$ layer can be formed under the conditions conventionally known.

<Method for Forming Titanium Compound Layer>

The film deposition conditions for the titanium compound layer can be, for example, a temperature of 950 to 1050° C., a pressure of 90 to 130 hPa and a gas flow rate (total gas flow rate) of 50 to 100 L/min. The "total gas flow rate" as used herein refers to the total volume flow rate of the gas introduced into a CVD furnace per unit time, with a gas in the normal state (0° C., 1 atm) as an ideal gas.

Raw material gases used are CH$_3$CN, CH$_4$, TiCl$_4$, CO, N$_2$, AlCl$_3$ and H$_2$. The proportions of CH$_3$CN, CH N$_2$ and H$_2$ contained in the raw material gases is varied depending on the thickness of the formed titanium compound layer, from the start of the film deposition. Specifically, it is varied as follows.

During forming a region (region B1) that is located at a distance of 0.5 μm or more and 1.0 μm or less from interface P1 between the titanium compound layer and the α-Al$_2$O$_3$ layer formed directly on the titanium compound layer, the proportions of the raw material gases are such that CH$_3$CN is 0.2% by volume or more and 1.0% by volume or less; CH$_4$ is 1.0% by volume or more and 2.5% by volume or less; TiCl$_4$ is 8.0% by volume or more and 9.0% by volume or less; CO is 0% by volume or more and 1.5% by volume or less; N$_2$ is 10.0% by volume or more and 15% by volume or less; AlCl$_3$ is 0% by volume or more and 1.5% by volume or less: and H$_z$ is the balance in % by volume, based on the total of the raw material gases of 100% by volume.

Then, during forming a region (a region sandwiched between region B1 and region B2) that is located at a distance of more than 0.3 μm and less than 0.5 μm from interface P1, the proportions of the raw material gases are changed from the proportions in region B1 to the following proportions in region B2. At this time, the proportion of each raw material gas is adjusted so that the amount of change per hour is constant.

Then, during forming a region (region B2) that is located at a distance of (0 μm or more and 0.3 μm or less from interface P1, the proportions of the raw material gases are such that CH$_3$CN is 0.4% by volume or more and 2.0% by volume or less, CH$_4$ is 0.8% by volume or more and 2.02% by volume or less, and N$_2$ is 8.0% by volume or more and 12.0% by volume or less, the content of H$_2$ is increased or decreased depending on the decrease or increase in the total content of CH$_3$CN, CH$_4$ and N$_2$ in the raw material gases as compared to during forming region B1 so that the total gas flow rate is the same as during forming the region B1; and the proportions of other gases are the same as those during forming region B1.

The proportion of CH$_3$CN contained in the raw material gases during forming region B2 is more than that of CH$_3$CN contained in the raw material gases during forming region B1. In addition, the proportion of CH$_4$ contained in the raw material gases during forming region B2 is less than that of Cl$_4$ contained in the raw material gases during forming region B1. This results in smaller average particle diameter b2 of the titanium compound particles in region B2 than average particle diameter b1 of the titanium compound particles in region B1.

During forming the titanium compound layer, either a combination of CO and CH$_4$ or CH$_3$CN has been conventionally used as raw material gases. Since CH$_4$ and CH$_3$CN are different in reactivity, CH$_4$ and CH$_3$CN have not been conventionally used at the same time during forming the titanium compound layer.

In contrast to the prior common knowledge in the art, in the present embodiment, as described above, only the particle diameter of the titanium compound particles can be adjusted without large variation in composition in the thickness direction of the titanium compound layer, by using CH$_4$ and CH$_3$CN as raw material gases at the same time while changing the proportions of CH$_4$ and CH$_3$CN together with the proportion of N$_2$. This is a finding newly discovered by the present inventors.

<Method for Forming α-Al$_2$O$_3$ Layer->

The film deposition conditions for the α-Al$_2$O$_3$ layer can be, for example, a temperature of 950 to 1050° C., a pressure of 60 to 90 hPa and a gas flow rate (total gas flow rate) of 50 to 100 L/min.

Raw material gases used are AlCl$_2$, HCl, CO$_2$, H$_2$S and H$_2$. The proportion of HCl and H$_2$ comprised in the raw material gases is varied depending on the thickness of the formed α-Al$_2$O$_3$ layer, from the start of the film deposition Specifically, it is varied as follows.

During forming a region (region A2) from the start of film deposition until the thickness of the α-Al$_2$O$_3$ layer is 0.3 μm, the proportions of the raw material gases are such that. HCl is 7.5% by volume or more and 11% by volume or less; AlCl$_3$ is 2% by volume or more and 5% by volume or less; CO$_2$ is 0.1% by volume or more and 6% by volume or less, H$_2$S is 0.1% by volume or more and 1% by volume or less; and H$_2$ is the balance in % by volume, based on the total of the raw material gases of 100% by volume.

Then, during forming a region (a region sandwiched between region A2 and region A1) in which the thickness of the $\alpha$-Al$_2$O$_3$ layer is more than 0.3 μm and less than 0.5 μm, the proportions of the raw material gases are changed from the proportions in region A2 to the following proportions in region A1. At this time, the proportion of each raw material gas is adjusted so that the amount of change per hour is constant.

Then, during forming as region (region A1) in which the thickness of the $\alpha$-Al$_2$O$_3$ layer is 0.5 μm or more and 1.0 μm or less, the proportions of the raw material gases are set such that HCl is 3.2% by volume or more and 7.0% by volume or less; the content of H$_2$ is increased by a decrement of HCl in the raw material gases as compared with that during forming region A2; and the proportions of the other gases are the same as those during forming region A2.

HCl has been conventionally used to inhibit $\alpha$-Al$_2$O$_3$ from being excessively produced during film deposition and to inhibit $\alpha$-Al$_2$O$_3$ particles from being formed in the gas phase. When $\alpha$-Al$_2$O$_3$ particles are formed in the gas phase, the $\alpha$-Al$_2$O$_3$ layer is not easily formed on the base material. On the other hand, it has been thought that a high proportion of HCl in the raw material gases will reduce the film deposition rate Therefore, it has been common knowledge in the ail that the proportion of HCl in the raw material gases should be minimized, and there has been no technical idea to increase the proportion of HCl in the raw material gases.

In contrast to the prior common knowledge in the art, in the present embodiment, the proportion of HCl is varied in order to control the particle diameters of the $\alpha$-Al$_2$O$_3$ particles as described above. The proportions of HCl in the raw material gases during forming region A2 are higher than that of HCl in the raw material gases conventionally used during forming an $\alpha$-Al$_2$O$_3$ layer (for example, 2.8% by volume or more and less than 6% by volume). This results in smaller average particle diameters of the $\alpha$-Al$_2$O$_3$ particles in region A1 and region A2. This is a finding newly discovered by the present inventors.

[Additional Description 12]

In the cutting tool of the present disclosure, ratio R3 of the total number of carbon and nitrogen atoms relative to the total number of carbon, nitrogen and oxygen atoms in region B1 can be 0.9 or more and 1.0 or less.

EXAMPLES

The present embodiments will be more specifically described with reference to Examples. However, the present embodiments are not limited by these Examples.

[Specimens 1 to 51 and Specimens 1-1 to 1-10]

The raw material powders having the formula composition shown in Table 1 were uniformly mixed, pressure molded into a predetermined shape followed by sintering at 1300 to 1500° C. for one to two hours to obtain a base material made of a cemented carbide (shape model number: CNM4G120408N-UX (manufactured by Sumitomo Electric Hardmetal Corp.)) in Table 1, "Balance" indicates that WC comprises the remainder of the formula composition (% by mass).

TABLE 1

| Formula composition (% by mass) | | | |
|---|---|---|---|
| TaC | NbC | Co | WC |
| 2.0 | 1.0 | 10.0 | Balance |

<Formation of Coating>

A coating was formed on the surface of the base material obtained above to manufacture a cutting tool. Specifically, the base material was set in a CVD device., and a coating was formed on the base material by a CVD. The configuration of the coating of each of the specimens is as shown in Tables 2 and 3. In Tables 2 and 3, "No" means that the layer in question is not formed for the specimen in question

TABLE 2

| Specimen No. | TiN layer (underlayer) Yes/No | Titanium compound layer Yes/No | Titanium compound layer Composition | $\alpha$-Al$_2$O$_3$ layer Yes/No | TiN layer (Surface layer) Yes/No |
|---|---|---|---|---|---|
| 1 | Yes | Yes | TiCNO | Yes | Yes |
| 2 | No | Yes | TiCNO | Yes | Yes |
| 3 | Yes | Yes | TiCNO | Yes | Yes |
| 4 | Yes | Yes | TiCNO | Yes | Yes |
| 5 | Yes | Yes | TiCNO | Yes | No |
| 6 | Yes | Yes | TiCNO | Yes | Yes |
| 7 | Yes | Yes | TiCNO | Yes | Yes |
| 8 | Yes | Yes | TiCNO | Yes | Yes |
| 9 | Yes | Yes | TiCNO | Yes | Yes |
| 10 | Yes | Yes | TiCNO | Yes | Yes |
| 11 | Yes | Yes | TiCNO | Yes | Yes |
| 12 | Yes | Yes | TiCNO | Yes | Yes |
| 13 | Yes | Yes | TiCNO | Yes | Yes |
| 14 | Yes | Yes | TiCNO | Yes | Yes |
| 15 | Yes | Yes | TiCNO | Yes | Yes |
| 16 | Yes | Yes | TiCNO | Yes | Yes |
| 17 | Yes | Yes | TiCNO | Yes | Yes |
| 18 | Yes | Yes | TiCN | Yes | Yes |
| 19 | Yes | Yes | TiCN | Yes | Yes |
| 20 | Yes | Yes | TiCN | Yes | Yes |
| 21 | Yes | Yes | TiAlCNO | Yes | Yes |
| 22 | Yes | Yes | TiAlCNO | Yes | Yes |
| 23 | Yes | Yes | TiAlCNO | Yes | Yes |
| 24 | Yes | Yes | TiAlCN | Yes | Yes |
| 25 | Yes | Yes | TiAlCN | Yes | Yes |
| 26 | Yes | Yes | TiAlCN | Yes | Yes |
| 27 | Yes | Yes | TiCNO | Yes | Yes |
| 28 | Yes | Yes | TiCNO | Yes | Yes |
| 29 | Yes | Yes | TiCNO | Yes | Yes |
| 30 | Yes | Yes | TiCNO | Yes | Yes |

TABLE 3

| Specimen No. | TiN layer (underlayer) Yes/No | Titanium compound layer Yes/No | Titanium compound layer Composition | $\alpha$-Al$_2$O$_3$ layer Yes/No | TiN layer (Surface layer) Yes/No |
|---|---|---|---|---|---|
| 31 | Yes | Yes | TiCNO | Yes | Yes |
| 32 | Yes | Yes | TiCNO | Yes | Yes |
| 33 | Yes | Yes | TiCNO | Yes | Yes |
| 34 | Yes | Yes | TiCNO | Yes | Yes |
| 35 | Yes | Yes | TiCNO | Yes | Yes |
| 36 | Yes | Yes | TiCNO | Yes | Yes |
| 37 | Yes | Yes | TiCNO | Yes | Yes |
| 38 | Yes | Yes | TiCN | Yes | Yes |
| 39 | Yes | Yes | TiCN | Yes | Yes |
| 40 | Yes | Yes | TiAlCNO | Yes | Yes |
| 41 | Yes | Yes | TiAlCNO | Yes | Yes |
| 42 | Yes | Yes | TiAlCN | Yes | Yes |
| 43 | Yes | Yes | TiAlCN | Yes | Yes |
| 44 | Yes | Yes | TiCNO | Yes | Yes |
| 45 | Yes | Yes | TiCNO | Yes | Yes |
| 46 | Yes | Yes | TiCNO | Yes | Yes |
| 47 | Yes | Yes | TiCNO | Yes | Yes |
| 48 | Yes | Yes | TiCNO | Yes | Yes |
| 49 | No | Yes | TiCNO | Yes | No |
| 1-1 | Yes | Yes | TiCNO | Yes | Yes |
| 1-2 | Yes | Yes | TiCNO | Yes | Yes |
| 1-3 | Yes | Yes | TiCNO | Yes | Yes |
| 1-4 | Yes | Yes | TiCNO | Yes | Yes |

TABLE 3-continued

| Specimen | TiN layer (underlayer) | Titanium compound layer | | α-Al₂O₃ layer | TiN layer (Surface layer) |
|---|---|---|---|---|---|
| No. | Yes/No | Yes/No | Composition | Yes/No | Yes/No |
| 1-5 | Yes | Yes | TiCNO | Yes | Yes |
| 1-6 | Yes | Yes | TiCNO | Yes | Yes |
| 1-7 | Yes | Yes | TiCNO | Yes | Yes |
| 1-8 | Yes | Yes | TiCNO | Yes | Yes |
| 1-9 | Yes | Yes | TiCNO | Yes | Yes |
| 1-10 | Yes | Yes | TiCNO | Yes | Yes |

The following layers are formed on the base material in the order listed, a TiN layer (underlayer), a titanium compound layer, an α-Al₂O₃ layer and a TiN layer (surface layer). The thickness of the TiN layer (underlayer) is 0.4 μm, and the thickness of the TiN layer(surface layer) is 0.7 μm.

Table 4 shows the film deposition conditions for the TiN layer (underlayer) and the TiN layer (surface layer).

TABLE 4

| | Flow rate of raw material gases (L/min) | Film deposition conditions | |
|---|---|---|---|
| | | Pressure (hPa) | Temperature (° C.) |
| TiN layer (underlayer) | TiCl₄: 5, N₂: 25, H₂: 70 | 150 | 980 |
| TiN layer (surface layer) | TiCl₄: 5, N₂: 25, H₂: 70 | 150 | 1050 |

Tables 5 to 8 show the film deposition conditions and the composition of the raw material gases for the titanium compound layer in each of the specimens. In Tables 5 to 8, "Balance" in the column "H₂" indicates that H₂ gas comprises the remainder of the composition (% by volume) of the raw material gases. During film deposition, a gas pipe for injecting the raw material gases was rotated at 2 rpm while fixing the base material. The total thickness of the titanium compound layer is as shown in the column "Thickness" in Tables 5 to 8.

TABLE 5

Titanium compound layer

| | Composition of raw material gases (% by volume) | | | | | | | | | | Film deposition conditions | | | | |
| | CH₃CN Region | | CH₄ Region | | | | N₂ Region | | | | Pressure (hPa) Region | | Temperature | Total gas flow rate | Thickness |
| Specimen No. | B1 | B2 | B1 | B2 | TiCl₄ | CO | B1 | B2 | AlCl₃ | H₂ | B1 | B2 | (° C.) | (L/min) | (μm) |
|---|---|---|---|---|---|---|---|---|---|---|---|---|---|---|---|
| 1 | 0.50 | 1.00 | 2.00 | 1.50 | 8.5 | 1.4 | 12.0 | 10.0 | 0 | Balance | 120 | | 1000 | 100 | 8 |
| 2 | 0.45 | 0.90 | 2.05 | 1.60 | 8.5 | 1.4 | 12.0 | 10.0 | 0 | Balance | 120 | | 1000 | 100 | 8 |
| 3 | 0.40 | 0.50 | 2.10 | 2.00 | 8.5 | 1.4 | 12.0 | 12.0 | 0 | Balance | 120 | | 1000 | 100 | 8 |
| 4 | 0.50 | 1.50 | 2.00 | 1.00 | 8.5 | 1.4 | 12:0 | 8.0 | 0 | Balance | 120 | | 1000 | 100 | 8 |
| 5 | 0.37 | 0.48 | 2.13 | 2.02 | 8.5 | 1.4 | 12.0 | 12.0 | 0 | Balance | 120 | | 1000 | 100 | 8 |
| 6 | 0.30 | 1.20 | 2.20 | 1.30 | 8.5 | 1.4 | 12.0 | 9.0 | 0 | Balance | 120 | | 1000 | 100 | 8 |
| 7 | 0.48 | 0.80 | 2.02 | 1.70 | 8.5 | 1.4 | 12.0 | 11.0 | 0 | Balance | 120 | | 1000 | 100 | 8 |
| 8 | 0.20 | 0.80 | 2.30 | 1.70 | 8.5 | 1.4 | 13.0 | 11.0 | 0 | Balance | 120 | | 1000 | 100 | 8 |
| 9 | 1.00 | 1.70 | 1.50 | 0.80 | 8.5 | 1.4 | 10.0 | 7.0 | 0 | Balance | 120 | | 1000 | 100 | 8 |
| 10 | 0.52 | 1.00 | 1.98 | 1.50 | 8.5 | 1.4 | 12.0 | 10.0 | 0 | Balance | 120 | | 1000 | 100 | 8 |
| 11 | 0.40 | 0.80 | 2.10 | 1.70 | 8.5 | 1.4 | 12.0 | 11.0 | 0 | Balance | 120 | | 1000 | 100 | 8 |
| 12 | 0.45 | 0.80 | 2.05 | 1.70 | 8.5 | 1.4 | 12.0 | 11.0 | 0 | Balance | 120 | | 1000 | 100 | 8 |
| 13 | 0.80 | 1.10 | 1.70 | 1.40 | 8.5 | 1.4 | 11.0 | 10.0 | 0 | Balance | 120 | | 1000 | 100 | 8 |
| 14 | 0.50 | 1.00 | 2.00 | 1.50 | 8.5 | 1.4 | 12.0 | 10.0 | 0 | Balance | 120 | | 1000 | 100 | 8 |
| 15 | 0.50 | 1.00 | 2.00 | 1.50 | 8.5 | 1.4 | 12.0 | 10.0 | 0 | Balance | 120 | | 1000 | 100 | 8 |
| 16 | 0.50 | 1.00 | 2.00 | 1.50 | 8.5 | 1.4 | 12.0 | 10.0 | 0 | Balance | 120 | | 1000 | 100 | 15 |

TABLE 6

Titanium compound layer

| | Composition of raw material gases (% by volume) | | | | | | | | | | Film deposition conditions | | | | |
| | CH₃CN Region | | CH₄ Region | | | | N₂ Region | | | | Pressure (hPa) Region | | Temperature | Total gas flow rate | Thickness |
| Specimen No. | B1 | B2 | B1 | B2 | TiCl₄ | CO | B1 | B2 | AlCl₃ | H₂ | B1 | B2 | (° C.) | (L/min) | (μm) |
|---|---|---|---|---|---|---|---|---|---|---|---|---|---|---|---|
| 17 | 0.50 | 1.00 | 2.00 | 1.50 | 8.5 | 1.4 | 12.0 | 10.0 | 0 | Balance | 120 | | 1000 | 100 | 3 |
| 18 | 1.00 | 1.50 | 2.50 | 2.00 | 9.0 | 0 | 14.0 | 12.0 | 0 | Balance | 100 | | 1000 | 100 | 15 |
| 19 | 1.00 | 1.50 | 2.50 | 2.00 | 9.0 | 0 | 14.0 | 12.0 | 0 | Balance | 100 | | 1000 | 100 | 8 |
| 20 | 1:00 | 1.50 | 2.50 | 2.00 | 9.0 | 0 | 14.0 | 12.0 | 0 | Balance | 100 | | 1000 | 100 | 3 |
| 21 | 0.50 | 1.00 | 2.00 | 1.50 | 8.0 | 1.4 | 12.0 | 10.0 | 1.5 | Balance | 120 | | 1000 | 100 | 15 |
| 22 | 0.50 | 1.00 | 2.00 | 1.50 | 8.0 | 1.4 | 12.0 | 10.0 | 1.5 | Balance | 120 | | 1000 | 100 | 8 |
| 23 | 0.50 | 1.00 | 2.00 | 1.50 | 8.0 | 1.4 | 12.0 | 10.0 | 1.5 | Balance | 120 | | 1000 | 100 | 3 |
| 24 | 1.00 | 1.50 | 2.50 | 2.00 | 8.0 | 0 | 14.0 | 12.0 | 1.5 | Balance | 100 | | 1000 | 100 | 15 |
| 25 | 1.00 | 1.50 | 2.50 | 2.00 | 8.0 | 0 | 14.0 | 12.0 | 1.5 | Balance | 100 | | 1000 | 100 | 8 |
| 26 | 1.00 | 1.50 | 2.50 | 2.00 | 8.0 | 0 | 14.0 | 12.0 | 1.5 | Balance | 100 | | 1000 | 100 | 3 |

TABLE 6-continued

| | Titanium compound layer | | | | | | | | | | | | |
| Spec-imen | CH₃CN Region | | CH₄ Region | | | | N₂ Region | | | | Fim deposition conditions | | | |
| | | | | | | | | | | | Pressure (hPa) Region | Temper-ature | Total gas flow rate | Thick-ness |
| No. | B1 | B2 | B1 | B2 | TiCl₄ | CO | B1 | B2 | AlCl₃ | H₂ | B1  B2 | (° C.) | (L/min) | (µm) |
|---|---|---|---|---|---|---|---|---|---|---|---|---|---|---|
| 27 | 0.50 | 1.00 | 2.00 | 1.50 | 8.5 | 1.4 | 12.0 | 10.0 | 0 | Balance | 120 | 1000 | 100 | 8 |
| 28 | 0.50 | 1.00 | 2.00 | 1.50 | 8.5 | 1.4 | 12.0 | 10.0 | 0 | Balance | 120 | 1000 | 100 | 8 |
| 29 | 0.52 | 1.00 | 1.98 | 1.50 | 8.5 | 1.4 | 12.0 | 10.0 | 0 | Balance | 120 | 1000 | 100 | 8 |
| 30 | 0.30 | 0.80 | 2.20 | 1.70 | 8.5 | 1.4 | 13.0 | 11.0 | 0 | Balance | 120 | 1000 | 100 | 8 |
| 31 | 0.45 | 0.80 | 2.05 | 1.70 | 8.5 | 1.4 | 12.0 | 11.0 | 0 | Balance | 120 | 1000 | 100 | 8 |
| 32 | 0.80 | 1.10 | 1.70 | 1.40 | 8.5 | 1.4 | 11.0 | 10.0 | 0 | Balance | 120 | 1000 | 100 | 8 |

TABLE 7

| | Titanium compound layer | | | | | | | | | | | | |
| Spec-imen | CH₃CN Region | | CH₄ Region | | | | N₂ Region | | | | Fim deposition conditions | | | |
| | | | | | | | | | | | Pressure (hPa) Region | Temper-ature | Total gas flow rate | Thick-ness |
| No. | B1 | B2 | B1 | B2 | TiCl₄ | CO | B1 | B2 | AlCl₃ | H₂ | B1  B2 | (° C.) | (L/min) | (µm) |
|---|---|---|---|---|---|---|---|---|---|---|---|---|---|---|
| 33 | 0.50 | 1.00 | 2.00 | 1.50 | 8.5 | 1.4 | 12.0 | 10.0 | 0 | Balance | 120 | 1000 | 100 | 6 |
| 34 | 0.50 | 1.00 | 2.00 | 1.50 | 8.5 | 1.4 | 12.0 | 10.0 | 0 | Balance | 120 | 1000 | 100 | 9 |
| 35 | 0.50 | 1.00 | 2.00 | 1.50 | 8.5 | 1.4 | 12.0 | 10.0 | 0 | Balance | 120 | 1000 | 100 | 17 |
| 36 | 0.50 | 1.00 | 2.00 | 1.50 | 8.5 | 1.4 | 12.0 | 10.0 | 0 | Balance | 120 | 1000 | 100 | 2 |
| 37 | 1.00 | 1.50 | 2.50 | 2.00 | 9.0 | 0 | 14.0 | 12.0 | 0 | Balance | 100 | 1000 | 100 | 17 |
| 38 | 1.00 | 1.50 | 2.50 | 2.00 | 9.0 | 0 | 14.0 | 12.0 | 0 | Balance | 100 | 1000 | 100 | 2 |
| 39 | 0.50 | 1.00 | 2.00 | 1.50 | 8.0 | 1.4 | 12.0 | 10.0 | 1.5 | Balance | 120 | 1000 | 100 | 17 |
| 40 | 0.50 | 1.00 | 2.00 | 1.50 | 8.0 | 1.4 | 12.0 | 10:0 | 1.5 | Balance | 120 | 1000 | 100 | 2 |
| 41 | 1.00 | 1.50 | 2.50 | 2.00 | 8.0 | 0 | 14.0 | 12.0 | 1.5 | Balance | 100 | 1000 | 100 | 17 |
| 42 | 1.00 | 1.50 | 2.50 | 2.00 | 8.0 | 0 | 14.0 | 12.0 | 1.5 | Balance | 100 | 1000 | 100 | 2 |
| 43 | 0.50 | 1.00 | 2.00 | 1.50 | 8.5 | 1.4 | 12.0 | 10.0 | 0 | Balance | 120 | 1000 | 100 | 8 |
| 44 | 0.50 | 1.00 | 2.00 | 1.50 | 8.5 | 1.4 | 14.0 | 10.0 | 0 | Balance | 120 | 1000 | 100 | 8 |
| 45 | 0.50 | 1.00 | 2.00 | 1.50 | 8.5 | 1.4 | 14.0 | 8.0 | 0 | Balance | 120 | 1000 | 100 | 8 |
| 46 | 0.50 | 1.00 | 2.00 | 1.50 | 8.5 | 1.4 | 10.0 | 12.0 | 0 | Balance | 120 | 1000 | 100 | 8 |

TABLE 8

| | Titanium compound layer | | | | | | | | | | | | | |
| Spec-imen | CH₃CN Region | | CH₄ Region | | | | N₂ Region | | | | Fim deposition conditions Pressure (hPa) Region | | Temper-ature | Total gas flow rate | Thick-ness |
| No. | B1 | B2 | B1 | B2 | TiCl₄ | CO | B1 | B2 | AlCl₃ | H₂ | B1 | B2 | (° C.) | (L/min) | (µm) |
|---|---|---|---|---|---|---|---|---|---|---|---|---|---|---|---|
| 47 | 0.50 | 1.00 | 2.00 | 1.50 | 8.5 | 1.6 | 12.0 | 10.0 | 0 | Balance | 120 | | 1000 | 100 | 8 |
| 48 | 0.50 | 1.00 | 2.00 | 1.50 | 8.5 | 1.8 | 12.0 | 10.0 | 0 | Balance | 120 | | 1000 | 100 | 8 |
| 49 | 0.50 | 1.00 | 2.00 | 1.50 | 8.5 | 1.8 | 12.0 | 10.0 | 0 | Balance | 120 | | 1000 | 100 | 8 |
| 1-1 | 0.45 | 0.90 | 2.05 | 1.60 | 8.5 | 1.4 | 12.0 | 10.0 | 0 | Balance | 120 | | 1000 | 100 | 8 |
| 1-2 | 0.40 | 0.50 | 2.10 | 2.00 | 8.5 | 1.4 | 12.0 | 12.0 | 0 | Balance | 120 | | 1000 | 100 | 8 |
| 1-3 | 0.50 | 1.50 | 2:00 | 1.00 | 8.5 | 1.4 | 12.0 | 8.0 | 0 | Balance | 120 | | 1000 | 100 | 8 |
| 1-4 | 0.37 | 0.48 | 2.13 | 2.02 | 8.5 | 1.4 | 12.0 | 12.0 | 0 | Balance | 120 | | 1000 | 100 | 8 |
| 1.5 | 0.25 | 1.20 | 2.25 | 1.30 | 8.5 | 1.4 | 13.0 | 9.0 | 0 | Balance | 120 | | 1000 | 100 | 8 |
| 1-6 | 0.50 | 0.80 | 2.00 | 1.70 | 8.5 | 1.4 | 12.0 | 11.0 | 0 | Balance | 120 | | 1000 | 100 | 8 |
| 1-7 | 0.10 | 0.80 | 2.40 | 1.70 | 8.5 | 1.4 | 14.0 | 11.0 | 0 | Balance | 120 | | 1000 | 100 | 8 |
| 1-8 | 1.20 | 0.80 | 1.30 | 1.70 | 8.5 | 1.4 | 9.0 | 11.0 | 0 | Balance | 120 | | 1000 | 100 | 8 |
| 1-9 | 0.50 | 0.50 | 2.00 | 2.00 | 8.5 | 1.4 | 12.0 | 12.0 | 0 | Balance | 120 | | 1000 | 100 | 8 |
| 1-10 | 0.60 | 0 | 0 | 4.00 | 8.0 | 2.0 | 20.0 | 10.0 | 0 | Balance | 70 | 200 | 1000 | 100 | 8 |

For example, the composition of the raw material gases during forming the titanium compound layer in Specimen 1 is as follows. During forming a region (region B1) that is located at a distance of 0.5 μm or more and 1.0 μm or less from interface P1 between the titanium compound layer and the α-Al₂O₃ layer formed directly on the titanium compound layer, the proportions of the raw material gases are such that CH₃CN is 0.50% by volume; CH₄ is 2.00% by volume: TiCl₄ is 8.5% by volume; CO is 1.4% by volume; N₂ is 12.0% by volume; AlCl₃ is 0% by volume; and H₂ is the balance in % by volume, based on the total of the raw material gases of 100% by volume. Region B1 is formed in such a manner.

Then, during forming a region (a region sandwiched between region B1 and region B2) that is located at a distance of more than 0.3 μm and less than 0.5 μm from interface P1, the proportions of the raw material gases are changed from the proportions in region B1 to the following proportions in region B2. At this time, the proportion of each raw material gas is adjusted so that the amount of change per hour is constant.

Then, during forming a region (region B2) that is located at a distance of 0 μm or more and 0.3 μm or less from interface P1, the proportions of the raw material gases are such that CH₃CN is 1.00% by volume, CH₄ is 1.50% by volume; TiCl₄ is 8.5% by volume, CO is 1.4% by volume; and N₂ is 10.0% by volume, and the content of H₂ is increased depending on the decrease in the total content of CH₃CN, CH₄ and N₂ in the raw material gases as compared to that during forming region B1 so that the total gas flow rate is constant. The total thickness of the formed titanium compound layer is 8 μm.

In Specimen 1-10, the composition of the raw material gases during forming the titanium compound layer is as follows. During forming region 1, the proportions of the raw material gases are such that CH³CN is 0.60% by volume; TiCl₄ is 8.0% by volume; CO is 2.0% by volume; N₂ is 20.0% by volume; and H₂ is the balance in % by volume, based on the total of the raw material gases of 100% by volume. The pressure during forming region B1 is set to 70 hPa. Region B1 is formed in such a manner. During forming region B2, the proportions of the raw material gases are such that CH₄ is 4.00% by volume; TiCl₄ is 8.0% by volume; CO is 2.0% by volume; N₂ is 10.0% by volume; and H₂ is the balance in % by volume, based on the total of the raw material gases of 100% by volume. The pressure during forming region B2 is set to 200 hPa. Region B2 is formed in such a manner. In Specimen 1-10, CH₃CN and CH₄ are not used at the same time.

Tables 9 and 10 show the composition of the raw material gases and the film deposition conditions for the α-Al₂O₃ layer in each of the specimens in Tables 9 and 10. "Balance" in the column "112" indicates that H₂ gas comprises the remainder of the composition (% by volume) of the raw material gases. During film deposition, a gas pipe for injecting the raw material gases was rotated at 2 rpm while fixing the base material. The total thickness of the α-Al₂O₃ layer is as shown in the column "Thickness" in Tables 9 and 10

TABLE 9

| | α-Al₂O₃ layer | | | | | | | | | |
| | Composition of raw material gases (% by volume) | | | | | | Film deposition conditons | | | |
| Spec-imen | | HCl Region | | | | | | Temper-ature | Total gas flow rate | Thick-ness |
| | | | | | | | Pressure | | | |
| No | AlCl₃ | A1 | A2 | CO₂ | H₂S | H₂ | (hPa) | (° C.) | (L/min) | (μm) |
| 1 | 2.2 | 5.5 | 9.0 | 3.0 | 0.6 | Balance | 70 | 1000 | 60 | 8 |
| 2 | 2.2 | 6.0 | 8.6 | 3.0 | 0.6 | Balance | 70 | 1000 | 60 | 8 |
| 3 | 2.2 | 5.0 | 8.5 | 3.0 | 0.6 | Balance | 70 | 1000 | 60 | 8 |
| 4 | 2.2 | 5.5 | 9.9 | 3.0 | 0.6 | Balance | 70 | 1000 | 60 | 8 |
| 5 | 2.2 | 6.5 | 7.7 | 3.0 | 0.6 | Balance | 70 | 1000 | 60 | 8 |
| 6 | 2.2 | 4.5 | 9.1 | 3.0 | 0.6 | Balance | 70 | 1000 | 60 | 8 |
| 7 | 2.2 | 6.0 | 8.6 | 3.0 | 0.6 | Balance | 70 | 1000 | 60 | 8 |
| 8 | 2.2 | 3.5 | 8.6 | 3.0 | 0.6 | Balance | 70 | 1000 | 60 | 8 |
| 9 | 2.2 | 6.7 | 10.0 | 3.0 | 0.6 | Balance | 70 | 1000 | 60 | 8 |
| 10 | 2.2 | 4.2 | 9.0 | 3.0 | 0.6 | Balance | 70 | 1000 | 60 | 8 |
| 11 | 2.2 | 6.7 | 8.6 | 3.0 | 0.6 | Balance | 70 | 1000 | 60 | 8 |
| 12 | 2.2 | 3.5 | 8.6 | 3.0 | 0.6 | Balance | 70 | 1000 | 60 | 8 |
| 13 | 2.2 | 6.7 | 9.1 | 3.0 | 0.6 | Balance | 70 | 1000 | 60 | 8 |
| 14 | 2.2 | 5.5 | 9.0 | 3.0 | 0.6 | Balance | 70 | 1000 | 60 | 15 |
| 15 | 2.2 | 5.5 | 9.0 | 3.0 | 0.6 | Balance | 70 | 1000 | 60 | 3 |
| 16 | 2.2 | 5.5 | 9.0 | 3.0 | 0.6 | Balance | 70 | 1000 | 60 | 8 |
| 17 | 2.2 | 5.5 | 9.0 | 3.0 | 0.6 | Balance | 70 | 1000 | 60 | 8 |
| 18 | 2.2 | 5.5 | 9.0 | 3.0 | 0.6 | Balance | 70 | 1000 | 60 | 8 |
| 19 | 2.2 | 5.5 | 9.0 | 3.0 | 0.6 | Balance | 70 | 1000 | 60 | 8 |
| 20 | 2.2 | 5.5 | 8.0 | 3.0 | 0.6 | Balance | 70 | 1000 | 60 | 8 |
| 21 | 2.2 | 5.5 | 9.0 | 3.0 | 0.6 | Balance | 70 | 1000 | 60 | 8 |
| 22 | 2.2 | 5.5 | 9.0 | 3.0 | 0.6 | Balance | 70 | 1000 | 60 | 8 |
| 23 | 2.2 | 5.5 | 9.0 | 3.0 | 0.6 | Balance | 70 | 1000 | 60 | 8 |
| 24 | 2.2 | 5.5 | 9.0 | 3.0 | 0.6 | Balance | 70 | 1000 | 60 | 8 |
| 25 | 2.2 | 5.5 | 9.0 | 3.0 | 0.6 | Balance | 70 | 1000 | 60 | 8 |
| 26 | 2.2 | 5.5 | 9.0 | 3.0 | 0.6 | Balance | 70 | 1000 | 60 | 8 |
| 27 | 2.2 | 7.0 | 8.6 | 3.0 | 0.6 | Balance | 70 | 1000 | 60 | 8 |
| 28 | 2.2 | 3.4 | 8.6 | 3.0 | 0.6 | Balance | 70 | 1000 | 60 | 8 |
| 29 | 2.2 | 3.7 | 9.0 | 3.0 | 0.6 | Balance | 70 | 1000 | 60 | 8 |
| 30 | 2.2 | 6.7 | 8.6 | 3.0 | 0.6 | Balance | 70 | 1000 | 60 | 8 |

TABLE 10

| | α-Al$_2$O$_3$ layer | | | | | | | | |
| | Composition of raw material gases (% by volume) | | | | | Film deposition conditons | | | |
| Spec-imen | | HCl Region | | | | | | Temper-ature | Tolal gas flow rate | Thick-ness |
| | | | | | | Pressure | | | |
| No | AlCl$_3$ | A1 | A2 | CO$_2$ | H$_2$S | H$_2$ | (hPa) | (° C.) | (L/min) | (μm) |
|---|---|---|---|---|---|---|---|---|---|---|
| 31 | 2.2 | 3.3 | 8.6 | 3.0 | 0.6 | Balance | 70 | 1000 | 60 | 8 |
| 32 | 2.2 | 7.5 | 9.1 | 3.0 | 0.6 | Balance | 70 | 1000 | 60 | 8 |
| 33 | 2.2 | 5.5 | 9.0 | 3.0 | 0.6 | Balance | 70 | 1000 | 60 | 17 |
| 34 | 2.2 | 5.5 | 9.0 | 3.0 | 0.6 | Balance | 70 | 1000 | 60 | 2 |
| 35 | 2.2 | 5.5 | 9.0 | 3.0 | 0.6 | Balance | 70 | 1000 | 60 | 6 |
| 36 | 2.2 | 5.5 | 9.0 | 3.0 | 0.6 | Balance | 70 | 1000 | 60 | 9 |
| 37 | 2.2 | 5.5 | 9.0 | 3.0 | 0.6 | Balance | 70 | 1000 | 60 | 6 |
| 38 | 2.2 | 5.5 | 9.0 | 3.0 | 0.6 | Balance | 70 | 1000 | 60 | 9 |
| 39 | 2.2 | 5.5 | 9.0 | 3.0 | 0.6 | Balance | 70 | 1000 | 60 | 6 |
| 40 | 2.2 | 5.5 | 9.0 | 3.0 | 0.6 | Balance | 70 | 1000 | 60 | 9 |
| 41 | 2.2 | 5.5 | 9.0 | 3.0 | 0.6 | Balance | 70 | 1000 | 60 | 6 |
| 42 | 2.2 | 5.5 | 9.0 | 3.0 | 0.6 | Balance | 70 | 1000 | 60 | 9 |
| 43 | 2.2 | 5.5 | 9.0 | 3.0 | 0.6 | Balance | 70 | 1000 | 60 | 8 |
| 44 | 2.2 | 5.5 | 9.0 | 3.0 | 0.6 | Balance | 70 | 1000 | 60 | 8 |
| 45 | 2.2 | 5.5 | 9.0 | 3.0 | 0.6 | Balance | 70 | 1000 | 60 | 8 |
| 46 | 2.2 | 5.5 | 9.0 | 3.0 | 0.6 | Balance | 70 | 1000 | 60 | 8 |
| 47 | 2.2 | 5.5 | 9.0 | 3.0 | 0.6 | Balance | 70 | 1000 | 60 | 8 |
| 48 | 2.2 | 5.5 | 9.0 | 3.0 | 0.6 | Balance | 70 | 1000 | 60 | 8 |
| 49 | 2.2 | 5.5 | 9.0 | 3.0 | 0.6 | Balance | 70 | 1000 | 60 | 8 |
| 1-1 | 2.2 | 5.5 | 8.3 | 3.0 | 0.6 | Balance | 70 | 1000 | 60 | 8 |
| 1-2 | 2.2 | 5.0 | 8.7 | 3.0 | 0.6 | Balance | 70 | 1000 | 60 | 8 |
| 1-3 | 2.2 | 5.0 | 9.9 | 3.0 | 0.6 | Balance | 70 | 1000 | 60 | 8 |
| 1-4 | 2.2 | 5.5 | 7.5 | 3.0 | 0.6 | Balance | 70 | 1000 | 60 | 8 |
| 1-5 | 2.2 | 4.5 | 9.1 | 3.0 | 0.6 | Balance | 70 | 1000 | 60 | 8 |
| 1-6 | 2.2 | 6.0 | 8.6 | 3.0 | 0.6 | Balance | 70 | 1000 | 60 | 8 |
| 1-7 | 2.2 | 3.5 | 8.6 | 3.0 | 0.6 | Balance | 70 | 1000 | 60 | 8 |
| 1-8 | 2.2 | 6.7 | 10.0 | 3.0 | 0.6 | Balance | 70 | 1000 | 60 | 8 |
| 1.9 | 2.2 | 3.3 | 8.3 | 3.0 | 0.6 | Balance | 70 | 1000 | 60 | 8 |
| 1-10 | 2.2 | 5.5 | 9.0 | 3.0 | 0.6 | Balance | 70 | 1000 | 60 | 8 |

35

For example, the film deposition conditions for the α-Al$_2$O$_3$ layer in Specimen 1 are as follows. During forming a region (region A2) until the thickness of the a-Al$_2$O$_3$ layer is 03 μm, the proportions of the raw material gases are such that AlCl$_3$ is 2.2% by volume, HCl is 9.0% by volume; CO$_2$ is 3.0% by volume: H$_2$S is 0.6% by volume; and H$_2$ is the balance in % by volume, based on the total of the raw material gases of 100% by volume.

Then, during forming a region (a region sandwiched between region A2 and region A1) in which the thickness of the α-Al$_2$O$_3$ layer more than 0.3 μm and less than 0.5 μm, the proportions of the raw material gases are changed from the proportions in region A2 to the following proportions in region A1. At this time, the proportion of each raw material gas is adjusted so that the amount of change per hour is constant.

Then, during forming as region (region A1) in which the thickness of the α-Al$_2$O$_3$ layer is 0.5 μm or more and 1.0 μm or less, the proportions of the raw material gases are such that: HCl is 5.5 by volume %; the content of H$_2$ is increased depending on the decrease in the content of HCl in the raw material gases as compared with that during forming region A2 so that the total gas flow rate is constant; and the proportions of the other gases are the same as those during forming region A2. The total thickness of the formed α-Al$_2$O$_3$ layer is 8 μm.

<Evaluation of Titanium Compound Layer>

For the titanium compound layer in each of the specimens, the following values were measured: average particle diameter b1 in region B1; average particle diameter b2 in region B2; the ratio R1 of the number of carbon atoms relative to the total number of carbon, nitrogen and oxygen atoms in region B1, the ratio R2 of the number of carbon atoms relative to the total number of carbon, nitrogen and oxygen atoms in region B2; the ratio R1/R2; the ratio R3 of the total number of carbon and nitrogen atoms relative to the total number of carbon, nitrogen and oxygen atoms in region B1; the ratio R4 of the total number of carbon and nitrogen atoms relative to the total number of carbon, nitrogen and oxygen atoms in region B2; and the composition of the titanium compound particle. These measurement methods areas shown in Embodiment 1, and they will be thereby not described repeatedly. The results are shown in the columns "Particle diameter b1", "Particle diameter b2", "R1", "R2", "R1/R2", "R3", "R4" and "Composition of titanium compound particle" in Tables 11 to 14.

<Evaluation of α-Al$_2$O$_3$ Layer>

For the α-Al$_2$O$_3$ layer of each of the specimens, the average particle diameter a1 in region A1, the average particle diameter a2 in region A2, and the orientation index TC (0 0 12) were measured. The measurement methods are as shown in Embodiment 1, and they will be thereby not described repeatedly. The results are shown in the columns "Particle diameter a1", "Particle diameter a2", and "TC (0 0 12)" in Tables 11 to 14.

< A2/b2, A1/A2, b1/b2>.

Values of a2b2, a1/a2, and b1/b2 were calculated based on the measured average particle diameters a1, a2, b1, and b2. The results are shown in the columns "a2/b2", "a1/a2" and "b1/b2" in Tables 11 to 14

TABLE 11

| Specimen No. | a1 | a2 | b1 | b2 | a2/b2 | a1/a2 | b1/b2 | a1/b1 | R1 | R2 | R1/R2 | R3 | R4 | Ti compound particle Composition | α-Al₂O₃ layer TC(0 0 12) | Evaluation 1 Fracture rate (%) | Evaluation 2 Vbmax (mm) | Evaluation 3 Vb (mm) |
|---|---|---|---|---|---|---|---|---|---|---|---|---|---|---|---|---|---|---|
| 1 | 0.60 | 0.10 | 0.20 | 0.10 | 1.00 | 6.00 | 2.00 | 3.00 | 0.55 | 0.55 | 1.0 | 0.9 | 0.8 | TiCNO | 6.5 | 5 | 0.15 | 0.15 |
| 2 | 0.60 | 0.16 | 0.25 | 0.12 | 1.25 | 3.33 | 2.08 | 2.00 | 0.55 | 0.55 | 1.0 | 0.9 | 0.8 | TiCNO | 6.5 | 15 | 0.35 | 0.15 |
| 3 | 0.70 | 0.16 | 0.30 | 0.20 | 0.80 | 4.38 | 1.50 | 2.33 | 0.55 | 0.55 | 1.0 | 0.9 | 0.8 | TiCNO | 6.5 | 15 | 0.35 | 0.15 |
| 4 | 0.60 | 0.06 | 0.20 | 0.06 | 1.00 | 10.00 | 3.33 | 3.00 | 0.55 | 0.55 | 1.0 | 0.9 | 0.8 | TiCNO | 7.0 | 20 | 0.35 | 0.15 |
| 5 | 0.42 | 0.28 | 0.32 | 0.22 | 1.27 | 1.50 | 1.45 | 1.31 | 0.55 | 0.55 | 1.0 | 0.9 | 0.8 | TiCNO | 7.0 | 40 | 0.25 | 0.15 |
| 6 | 0.80 | 0.09 | 0.40 | 0.08 | 1.13 | 8.89 | 5.00 | 2.00 | 0.55 | 0.55 | 1.0 | 0.9 | 0.8 | TiCNO | 7.0 | 15 | 0.35 | 0.20 |
| 7 | 0.60 | 0.16 | 0.22 | 0.15 | 1.00 | 3.33 | 1.47 | 2.27 | 0.55 | 0.50 | 1.1 | 0.9 | 0.8 | TiCNO | 6.0 | 15 | 0.35 | 0.15 |
| 8 | 1.00 | 0.15 | 0.60 | 0.16 | 1.00 | 6.67 | 3.33 | 2.00 | 0.55 | 0.50 | 1.1 | 0.9 | 0.8 | TiCNO | 6.0 | 10 | 0.30 | 0.25 |
| 9 | 0.40 | 0.06 | 0.10 | 0.05 | 1.00 | 8.00 | 2.00 | 4.00 | 0.55 | 0.50 | 1.1 | 0.9 | 0.8 | TiCNO | 6.0 | 25 | 0.35 | 0.13 |
| 10 | 0.85 | 0.10 | 0.17 | 0.10 | 1.00 | 8.60 | 1.70 | 5.00 | 0.55 | 0.50 | 1.1 | 0.9 | 0.8 | TiCNO | 5.0 | 10 | 0.35 | 0.20 |
| 11 | 0.40 | 0.16 | 0.30 | 0.15 | 1.00 | 2.67 | 2.00 | 1.33 | 0.55 | 0.50 | 1.1 | 0.9 | 0.8 | TiCNO | 5.0 | 45 | 0.15 | 0.13 |
| 12 | 1.00 | 0.15 | 0.25 | 0.16 | 1.00 | 6.67 | 1.67 | 4.00 | 0.55 | 0.50 | 1.1 | 0.9 | 0.8 | TiCNO | 5.0 | 15 | 0.30 | 0.25 |
| 13 | 0.40 | 0.09 | 0.15 | 0.08 | 1.00 | 4.44 | 1.67 | 2.67 | 0.55 | 0.50 | 1.1 | 0.9 | 0.8 | TiCNO | 4.0 | 40 | 0.20 | 0.15 |
| 14 | 0.60 | 0.10 | 0.20 | 0.10 | 1.00 | 6.00 | 2.00 | 3.00 | 0.55 | 0.50 | 1.1 | 0.9 | 0.8 | TiCNO | 4.0 | 45 | 0.35 | 0.10 |
| 15 | 0.60 | 0.10 | 0.20 | 0.10 | 1.00 | 6.00 | 2.00 | 3.00 | 0.55 | 0.50 | 1.1 | 0.9 | 0.8 | TiCNO | 4.0 | 0 | 0.10 | 0.25 |
| 16 | 0.60 | 0.10 | 0.20 | 0.10 | 1.00 | 6.00 | 2.00 | 3.00 | 0.55 | 0.50 | 1.1 | 0.9 | 0.8 | TiCNO | 3.0 | 40 | 0.35 | 0.12 |
| 17 | 0.60 | 0.10 | 0.20 | 0.10 | 1.00 | 6.00 | 2.00 | 3.00 | 0.55 | 0.50 | 1.1 | 0.9 | 0.8 | TiCNO | 3.0 | 0 | 0.12 | 0.25 |
| 18 | 0.60 | 010 | 0.20 | 0.10 | 1.00 | 6.00 | 2.00 | 3.00 | 0.60 | 0.50 | 1.0 | 1.0 | 1.0 | TiCN | 3.0 | 45 | 0.39 | 0.12 |

TABLE 12

| Specimen No. | a1 | a2 | b1 | b2 | a2/b2 | a1/a2 | b1/b2 | a1/b1 | R1 | R2 | R1/R2 | R3 | R4 | Ti compound particle Composition | α-Al₂O₃ layer TC(0 0 12) | Evaluation 1 Fracture rate (%) | Evaluation 2 Vbmax (mm) | Evaluation 3 Vb (mm) |
|---|---|---|---|---|---|---|---|---|---|---|---|---|---|---|---|---|---|---|
| 19 | 0.60 | 0.10 | 0.20 | 0.10 | 1.00 | 6.00 | 2.00 | 3.00 | 0.60 | 0.60 | 1.0 | 1.0 | 1.0 | TiCN | 6.5 | 15 | 0.25 | 0.15 |
| 20 | 0.60 | 0.10 | 0.20 | 0.10 | 1.00 | 6.00 | 2.00 | 3.00 | 0.60 | 0.60 | 1.0 | 1.0 | 1.0 | TiCN | 7.0 | 10 | 0.20 | 0.28 |
| 21 | 0.60 | 0.10 | 0.20 | 0.10 | 1.00 | 6.00 | 2.00 | 3.00 | 0.55 | 0.50 | 1.1 | 0.9 | 0.8 | TiAlCNO | 7.0 | 40 | 0.35 | 0.12 |
| 22 | 0.60 | 0.10 | 0.20 | 0.10 | 1.00 | 6.00 | 2.00 | 3.00 | 0.55 | 0.50 | 1.1 | 0.9 | 0.8 | TiAlCNO | 6.5 | 5 | 0.12 | 0.15 |
| 23 | 0.60 | 0.10 | 0.20 | 0.10 | 1.00 | 6.00 | 2.00 | 3.00 | 0.55 | 0.50 | 1.1 | 0.9 | 0.8 | TiAlCNO | 3.5 | 0 | 0.10 | 0.28 |
| 24 | 0.60 | 0.10 | 0.20 | 0.10 | 1.00 | 6.00 | 2.00 | 3.00 | 0.60 | 0.60 | 1.0 | 1.0 | 1.0 | TiAlCN | 4.5 | 40 | 0.38 | 0.12 |
| 25 | 0.60 | 0.10 | 0.20 | 0.10 | 1.00 | 6.00 | 2.00 | 3.00 | 0.60 | 0.60 | 1.0 | 1.0 | 1.0 | TiAlCN | 4.5 | 0 | 0.15 | 0.15 |
| 26 | 0.60 | 0.10 | 0.20 | 0.10 | 1.00 | 6.00 | 2.00 | 3.00 | 0.60 | 0.60 | 1.0 | 1.0 | 1.0 | TiAlCN | 4.5 | 0 | 0.12 | 0.28 |
| 27 | 1.10 | 0.15 | 0.25 | 0.15 | 1.00 | 7.33 | 1.67 | 4.40 | 0.55 | 0.55 | 1.0 | 0.9 | 0.8 | TiCNO | 6.5 | 15 | 0.30 | 0.28 |
| 28 | 0.35 | 0.09 | 0.15 | 0.09 | 1.00 | 3.89 | 1.67 | 2.33 | 0.55 | 0.55 | 1.0 | 0.9 | 0.8 | TiCNO | 6.5 | 45 | 0.20 | 0.15 |
| 29 | 0.60 | 0.10 | 0.20 | 0.10 | 1.00 | 6.00 | 2.00 | 3.00 | 0.55 | 0.55 | 1.0 | 0.9 | 0.8 | TiCNO | 2.5 | 5 | 0.15 | 0.35 |
| 30 | 0.95 | 0.10 | 0.17 | 0.10 | 1.00 | 9.50 | 1.70 | 5.69 | 0.55 | 0.50 | 1.1 | 0.9 | 0.8 | TiCNO | 6.5 | 10 | 0.40 | 0.20 |
| 31 | 0.40 | 0.15 | 0.40 | 0.15 | 1.00 | 2.67 | 2.67 | 1.00 | 0.56 | 0.50 | 1.1 | 0.9 | 0.8 | TiCNO | 6.5 | 50 | 0.15 | 0.13 |
| 32 | 1.20 | 0.15 | 0.25 | 0.16 | 1.00 | 8.00 | 1.67 | 4.80 | 0.55 | 0.50 | 1.1 | 0.9 | 0.8 | TiCNO | 6:5 | 15 | 0.30 | 0.35 |
| 33 | 0.30 | 0.09 | 0.15 | 0.09 | 1.00 | 3.33 | 1.67 | 2.00 | 0.56 | 0.50 | 1.1 | 0.9 | 0.8 | TiCNO | 6.5 | 55 | 0.20 | 0.15 |
| 34 | 0.60 | 0.10 | 0.20 | 0.10 | 1.00 | 6.00 | 2.00 | 3.00 | 0.55 | 0.50 | 1.1 | 0.9 | 0.8 | TiCNO | 6.5 | 60 | 0.45 | 0.10 |
| 35 | 0.60 | 0.10 | 0.20 | 0:10 | 1.00 | 6.00 | 2.00 | 3.00 | 0.65 | 0.50 | 1.1 | 0.9 | 0.8 | TICNO | 6.5 | 0 | 0.10 | 0.3 |

TABLE 13

| Specimen No. | a1 | a2 | b1 | b2 | a2/b2 | a1/a2 | b1/b2 | a1/b1 | R1 | R2 | R1/R2 | R3 | R4 | Ti compound particle Composition | α-Al₂O₃ layer TC(0 0 12) | Evaluation 1 Fracture rate (%) | Evaluation 2 Vbmax (mm) | Evaluation 3 Vb (mm) |
|---|---|---|---|---|---|---|---|---|---|---|---|---|---|---|---|---|---|---|
| 36 | 0.60 | 0.10 | 0.20 | 0.10 | 1.00 | 6.00 | 2.00 | 3.00 | 0.55 | 0.50 | 1.1 | 0.9 | 0.8 | TiCNO | 6.5 | 60 | 0.45 | 0.12 |
| 37 | 0.60 | 0.10 | 0.20 | 0.10 | 1.00 | 6.00 | 2.00 | 3.00 | 0.55 | 0.50 | 1.1 | 0.9 | 0.8 | TiCNO | 6.5 | 0 | 0.12 | 0.30 |
| 38 | 0.60 | 0.10 | 0.20 | 0.10 | 1.00 | 6.00 | 2.00 | 3.00 | 0.60 | 0.60 | 1.0 | 1.0 | 1.0 | TiCN | 6.5 | 60 | 0.49 | 0.12 |
| 39 | 0.60 | 0.10 | 0.20 | 0.10 | 1.00 | 6.00 | 2.00 | 3.00 | 0.60 | 0.60 | 1.0 | 1.0 | 1.0 | TiCN | 6.5 | 10 | 0.20 | 0.35 |
| 40 | 0.60 | 0.10 | 0.20 | 0.10 | 1.00 | 6.00 | 2.00 | 3.00 | 0.55 | 0.50 | 1.1 | 0.9 | 0.8 | TiAlCNO | 6.5 | 50 | 0.45 | 0.12 |
| 41 | 0.60 | 0.10 | 0.20 | 0.10 | 1.00 | 6.00 | 2.00 | 3.00 | 0.55 | 0.50 | 1.1 | 0.9 | 0.8 | TiAlCNO | 6.5 | 0 | 0.10 | 0.35 |
| 42 | 0.60 | 0.10 | 0.20 | 0.10 | 1.00 | 6.00 | 2.00 | 3.00 | 0.60 | 0.60 | 1.0 | 1.0 | 1.0 | TiAlCN | 6.5 | 60 | 0.48 | 0.12 |
| 43 | 0.60 | 0.10 | 0.20 | 0.10 | 1.00 | 6.00 | 2.00 | 3.00 | 0.60 | 0.60 | 1.0 | 1.0 | 1.0 | TiAlCN | 6.5 | 0 | 0.12 | 0.35 |
| 44 | 0.60 | 0.10 | 0.20 | 0.10 | 1.00 | 6.00 | 2.00 | 3.00 | 0.60 | 0.66 | 0.9 | 0.9 | 0.9 | TiCNO | 6.5 | 10 | 0.20 | 0.15 |
| 45 | 0.60 | 0.10 | 0.20 | 0.10 | 1.00 | 6.00 | 2.00 | 3.00 | 0.50 | 0.60 | 0.8 | 09 | 0.9 | TiCNO | 6.5 | 15 | 0.35 | 0.15 |

TABLE 13-continued

| Spec-imen | Particle diameter (μm) | | | | | | | | | | | | | | Ti com-pound particle Com- | α-Al₂O₃ layer | Evalu-ation 1 Fracture rate | Evalu-ation 2 Vbmax | Evalu-ation 3 Vb |
|---|---|---|---|---|---|---|---|---|---|---|---|---|---|---|---|---|---|---|---|
| No. | a1 | a2 | b1 | b2 | a2/b2 | a1/a2 | b1/b2 | a1/b1 | R1 | R2 | R2 | R3 | R4 | R1/ position | TC(0 0 12) | (%) | (mm) | (mm) |
| 46 | 0.60 | 0.10 | 0.20 | 0.10 | 1.00 | 6.00 | 2.00 | 3.00 | 0.80 | 0.50 | 1.2 | 0.9 | 0.9 | TiCNO | 6.5 | 15 | 0.36 | 0.15 |
| 47 | 0.60 | 0.10 | 0.20 | 0.10 | 1.00 | 6.00 | 2.00 | 3.00 | 0.55 | 0.55 | 1.0 | 0.8 | 0.9 | TiCNO | 6.5 | 15 | 0.15 | 0.20 |
| 48 | 0.60 | 0.10 | 0.20 | 0.10 | 1.00 | 6.00 | 2.00 | 3.00 | 0.55 | 0.55 | 1.0 | 0.7 | 0.9 | TiCNO | 6.5 | 20 | 0.15 | 0.25 |
| 49 | 0.60 | 0.10 | 0.20 | 0.10 | 1.00 | 6.00 | 2.00 | 3.00 | 0.55 | 0.56 | 1.0 | 0.9 | 0.7 | TiCNO | 6.5 | 20 | 0.15 | 0.25 |
| 1-1 | 0.60 | 0.20 | 0.20 | 0.12 | 1.67 | 3.00 | 2.08 | 2.40 | 0.55 | 0.50 | 1.1 | 0.9 | 0.8 | TiCNO | 6.5 | 15 | 0.55 | 0.15 |
| 1-2 | 0.70 | 0.14 | 0.20 | 0.20 | 0.70 | 5.00 | 1.50 | 2.33 | 0.55 | 0.50 | 1.1 | 0.9 | 0.8 | TiCNO | 6.5 | 15 | 0.55 | 0.15 |
| 1-3 | 0.70 | 0.05 | 0.20 | 0.06 | 1.00 | 11.67 | 3.33 | 3.50 | 0.55 | 0.50 | 1.1 | 0.9 | 0.8 | TiCNO | 6.5 | 20 | 0.54 | 0.15 |

TABLE 14

| Spec-imen | Particle diameter (μm) | | | | | | | | | | | | | | Ti com-pound particle Com- | α-Al₂O₃ layer | Evalu-ation 1 Fracture rate | Evalu-ation 2 Vbmax | Evalu-ation 3 Vb |
|---|---|---|---|---|---|---|---|---|---|---|---|---|---|---|---|---|---|---|---|
| No. | a1 | a2 | b1 | b2 | a2/b2 | a1/a2 | b1/b2 | a1/b1 | R1 | R2 | R2 | R3 | R4 | R1/ position | TC(0 0 12) | (%) | (mm) | (mm) |
| 1-4 | 0.42 | 0.30 | 0.32 | 0.22 | 1.36 | 1.40 | 1.45 | 1.31 | 0.55 | 0.50 | 1.1 | 0.9 | 0.8 | TiCNO | 6.5 | 80 | 0.25 | 0.15 |
| 1-5 | 0.80 | 0.09 | 0.45 | 0.08 | 1.13 | 8.89 | 5.63 | 1.78 | 0.55 | 0.50 | 1.1 | 0.9 | 0.8 | TiCNO | 6.5 | 30 | 0.57 | 0.20 |
| 1-6 | 0.50 | 0.15 | 0.20 | 0.15 | 1.00 | 3.33 | 1.33 | 2.50 | 0.55 | 0.50 | 1.1 | 0.9 | 0.8 | TiCNO | 6.5 | 35 | 0.53 | 0.15 |
| 1-7 | 1.00 | 0.15 | 0.60 | 0.15 | 1.00 | 6.67 | 4.00 | 1.67 | 0.55 | 0.50 | 1.1 | 0.9 | 0.8 | TiCNO | 6.5 | 5 | 0.35 | 0.40 |
| 1-8 | 0.40 | 0.05 | 0.08 | 0.05 | 1.00 | 8.00 | 1.60 | 6.00 | 0.55 | 0.50 | 1.1 | 0.9 | 0.8 | TiCNO | 6.5 | 30 | 0.50 | 0.13 |
| 1-9 | 1.20 | 0.20 | 0.20 | 0.20 | 1.00 | 6.00 | 1.00 | 6.00 | 0.55 | 0.50 | 1.1 | 0.9 | 0.8 | TiCNO | 6.5 | 65 | 0.50 | 0.20 |
| 1-10 | 0.60 | 0.10 | 0.70 | 0.10 | 1.00 | 6.00 | 7.00 | 0.86 | 0.60 | 0.50 | 1.2 | 0.8 | 0.8 | TiCNO | 6.5 | 70 | 0.60 | 0.15 |

<Evaluation of Tool Life>

A cutting test was performed using each of the cutting tools obtained above to evaluate breakage resistance, peeling resistance and wear resistance. Specifically, each of the cutting tools was subjected to evaluations described in Cutting evaluations 1 to 3 below. In the present specification, if the evaluations of each of the cutting tools for all items of breakage resistance, peeling resistance and wear resistance are good according to the criteria described in Cutting evaluations 1 to 3 below, the cutting tool is judged to have a long tool life.

<Cutting Evaluation 1>

A cutting test was performed under the following cutting conditions 1 using each of the cutting tools obtained above to evaluate breakage resistance. For twenty different cutting edges, cutting was performed with each of the cutting edges for 20 seconds, and each of the cutting edges was checked for the presence or absence of fracture(s), wherein "fracture" means that a chip(s) of 500 μm or more is (are) observed.

The proportion of the cutting edges having the fracture(s) occurring of the twenty cutting edges was calculated to obtain the fracture rate (%). That is, the fracture rate (%)=(number of cutting edges having the fracture(s) occurring/20)×100. In this Example, when the fracture rate is less than 65%, the cutting tool is good in breakage resistance. The results are shown in the column "Cutting evaluation 1—Fracture rate (%)" in Tables 11 to 14.

<Cutting Conditions 1>

Workpiece. SCM440 (fluted round bar)
Machining: intermittent turning of the outer diameter of a fluted round bar
Cutting speed: 120 m/min
Feed amount, 0.15 mm/rev
Cut amount: 2.0 mm
Cutting fluid: None The above cutting conditions correspond to those in a test simulating interrupted turning of chromium molybdenum steel.

<Cutting Evaluation 2>

A cutting test was performed under the following cutting conditions 2 using each of the cutting tools obtained above to evaluate welding resistance. The maximum wear amount Vbmax (mm) on the flank face side of the cutting tool after cutting for 15 minutes was measured. The term "maximum wear amount" as used herein means the maximum value of the distances from the ridgeline to the end of flank face wear. The smaller the maximum wear amount is, the better peeling resistance is.

In the present Example, when the maximum wear amount is less than 0.50 mm, the cutting tool has a good peeling resistance. The results are shown in the column "Cutting evaluation 2—Vbmax (mm)" in Tables 11 to 14.

<<Cutting Conditions 2>>

Workpiece: SCM415
Machining, turning of the outer diameter of a round bar
Cutting speed, 180 m/min
Feed amount: 0.15 mm/rev
Cut amount: 2.0 mm
Cutting fluid: water-soluble cutting oil The above cutting conditions correspond to those in a test simulating machining in which welding and peeling tend to easily occur.

<Cutting Evaluation 3>

A cutting test was performed under the following cutting conditions 3 using each of the cutting tools obtained above. The average wear amount Vb (mm) on the flank face side of the cutting tool after cutting for 15 minutes was measured. The term "average wear amount" as used herein means the length determined by averaging the distances from the ridgeline to the end of flank face wear. In the present Examples, when the average wear amount is less than 0.40 mm, the cutting tool is judged to have good wear resistance. The results are shown in the column "Cutting evaluation 3—Vb (mm)" in Tables 11 to 14.

<Cutting Conditions 3>
Workpiece S45C
Machining: turning of the outer diameter of a round bar
Cutting speed: 250 m/min
Feed amount 0.25 mm/rev
Cut amount: 2.0 mm
Cutting fluid, water-soluble cutting oil
The above cutting conditions correspond to those in a test simulating continuous machining.

<Discussions>
The cutting tools of Specimens 1 to 49 correspond to Examples. These specimens were continued to have excellent breakage resistance, peeling resistance and wear resistance and to have a long tool life.

The cutting tools of Specimens 1-1 to 1-10 correspond to Comparative Examples. Specimens 1-4 and 1-9 had insufficient breakage resistance. Specimens 1-1 to 1-3, Specimen 1-5, Specimen 1-6 and Specimens 1-8 to 1-10 had insufficient peeling resistance. Specimen 1-7 had insufficient wear resistance.

Although the embodiments and Examples of the present disclosure have been described above, the configurations of the above-described embodiments and examples are contemplated from the beginning to be appropriately combined or variously modified.

The embodiments and Examples disclosed herein should be considered as exemplary and not as restrictive in all respects. The scope of the present invention is specified by the claims rather than the embodiments and examples described above, and is intended to include meanings equivalent to the claims and to include all modifications within the scope thereof.

REFERENCE SIGNS LIST

1: cutting tool; 10: base material; 11: $\alpha$-$Al_2O_3$ layer; 12: TiN layer; 13: surface layer; 14: titanium compound layer; 15: coating; A1: region A1; A2: region A2; B1: region B1; B2: region B2; P1: interface; P2: surface; SA1, SA2, SA3, SB1, SB2, SB3: imaginary plane; LS1: reference line; L1, L2, L3, L4: line.

The invention claimed is:

1. A cutting tool comprising a base material and a coating arranged on the base material; wherein:

the coating comprises a titanium compound layer arranged on the base material and an $\alpha$-$Al_2O_3$ layer arranged directly on the titanium compound layer;

the $\alpha$-$Al_2O_3$ layer is composed of a plurality of a$\alpha$-$Al_2O_3$ particles;

the $\alpha$-$Al_2O_3$ layer comprises a region A1 and a region A2;

the region A1 is a region sandwiched between an imaginary plane SA2, which is located at a distance of 0.5 $\mu$m from an interface P1 between the titanium compound layer and the $\alpha$-$Al_2O_3$ layer toward the surface side of the coating, and an imaginary plane SA3, which is located at a distance of 1.0 $\mu$m from the interface P1 toward the surface side of the coating;

the region A2 is a region sandwiched between the interface P1 and an imaginary plane SAI that is located at a distance of 0.3 $\mu$m from the interface P1 toward the surface side of the coating;

the titanium compound layer is composed of a plurality of titanium compound particles;

the titanium compound particles are one selected from the group consisting of TiCN particles, TiCNO particles, TiAlCN particles and TiAlCNO particles;

the titanium compound layer comprises a region B1 and a region B2;

the region B1 is a region sandwiched between an imaginary plane SB2, which is located at a distance of 0.5 um from the interface P1 toward the base material side, and an imaginary plane SB3, which is located at a distance of 1.0 $\mu$m from the interface P1 toward the base material side;

the region B2 is a region sandwiched between the interface Pl and an imaginary plane SB1 that is located at a distance of 0.3 um from the interface P1 toward the base material side;

an average particle diameter al of the $\alpha$-$Al_2O_3$ particles in the region A1, an average particle diameter a2 of the $\alpha$-$Al_2O_3$ particles in the region A2, an average particle diameter b1 of the titanium compound particles in the region B1, and an average particle diameter b2 of the titanium compound particles in the region B2 satisfy relationships represented by respective expressions 1 to 3:

$$0.80 \leq a2/b2 \leq 1.27 \qquad \text{Expression 1}$$

$$1.50 \leq a1/a2 \leq 10 \qquad \text{Expression 2}$$

$$1.45 \leq b1/b2 \leq 5; \text{ and} \qquad \text{Expression 3}$$

the average particle diameter b1 is 0.10 $\mu$m or more and 0.50 $\mu$m or less.

2. The cutting tool according to claim 1, wherein:

a ratio R1/R2 between a ratio RI of the number of carbon atoms relative to the total number of carbon, nitrogen and oxygen atoms in the region B1 and a ratio R2 of the number of carbon atoms relative to the total number of carbon, nitrogen and oxygen atoms in the region B2 is 0.9 or more and 1.1 or less;

a ratio R3 of the total number of carbon and nitrogen atoms relative to the total number of carbon, nitrogen and oxygen atoms in the region B1 is 0.8 or more and 1.0 or less; and a ratio R4 of the total number of carbon and nitrogen atoms relative to the total number of carbon, nitrogen and oxygen atoms in the region B2 is 0.8 or more and 1.0 or less.

3. The cutting tool according to claim 1, wherein:

a ratio a1/b1 of the average particle diameter a1 to the average particle diameter b1 is 1.50 or more and 5 or less; and the average particle diameter a1 is 0.40 $\mu$m or more and 1.00 $\mu$m or less.

4. The cutting tool according to claim 1, wherein:

an average thickness of the titanium compound layer is 1.0 $\mu$m or more and 15 $\mu$m or less; and an average thickness of the $\alpha$-$Al_2O_3$ layer is 1.0 $\mu$m or more and 15 $\mu$m or less.

5. The cutting tool according to claim 1, wherein the $\alpha$-$Al_2O_3$ layer has a TC (0 0 12) of 3 or more in an orientation index TC (hkl).

6. The cutting tool according to claim 1, wherein the coating comprises a TiN layer arranged between the base material and the titanium compound layer.

7. The cutting tool according to claim 1, wherein the ratio a2/b2 of the average particle diameter a2 to the average particle diameter b2 is 1.00 or more and 1.10 or less.

8. The cutting tool according to claim 1, wherein the ratio a1/a2 of the average particle diameter al to the average particle diameter a2 is 2.00 or more and 10 or less.

9. The cutting tool according to claim 1, wherein the ratio b1/b2 of the average particle diameter bl to the average particle diameter b2 is 1.50 or more and 5 or less.

10. The cutting tool according to claim 1, wherein a ratio a1/b1 of the average particle diameter a1 to the average particle diameter b1 is 2.00 or more and 4.50 or less.

11. The cutting tool according to claim 1, wherein the average particle diameter b1 is 0.15 μm or more and 0.50 μm or less.

12. The cutting tool according to claim 5, wherein the TC (0 0 12) is 4 or more.

13. The cutting tool according to claim 1, wherein the average particle diameter a1 is 0.30 μm or more and 1.20 μm or less.

* * * * *